(12) United States Patent
Shiiyama et al.

(10) Patent No.: US 8,412,730 B2
(45) Date of Patent: Apr. 2, 2013

(54) IMAGE SEARCH APPARATUS AND METHOD THEREOF

(75) Inventors: Hirotaka Shiiyama, Yokohama (JP); Hidetomo Sohma, Yokohama (JP); Koichi Magai, Tokyo (JP); Masahiro Matsushita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 338 days.

(21) Appl. No.: 12/778,953

(22) Filed: May 12, 2010

(65) Prior Publication Data

US 2010/0299355 A1 Nov. 25, 2010

(30) Foreign Application Priority Data

May 25, 2009 (JP) ................................ 2009-125845

(51) Int. Cl.
*G06F 17/30* (2006.01)
(52) U.S. Cl. ...................................................... 707/769
(58) Field of Classification Search .................. 707/769, 707/770, 758
See application file for complete search history.

(56) References Cited

U.S. PATENT DOCUMENTS

| 4,618,989 | A | * | 10/1986 | Tsukune et al. | ............... | 382/203 |
| 5,905,811 | A | | 5/1999 | Shiiyama et al. | | |
| 6,642,929 | B1 | * | 11/2003 | Essafi et al. | .................... | 345/581 |
| 7,400,784 | B2 | * | 7/2008 | Joly | ............................... | 382/305 |
| 7,418,135 | B2 | * | 8/2008 | Shiiyama | ...................... | 382/181 |
| 2007/0143272 | A1 | * | 6/2007 | Kobayashi | ........................ | 707/3 |

FOREIGN PATENT DOCUMENTS

JP 2006-065399 A 3/2006

OTHER PUBLICATIONS

U.S. Appl. No. 12/768,559, filed Apr. 27, 2010. Applicants: Hirotaka Shiiyama, et al.
U.S. Appl. No. 12/764,660, filed Apr. 21, 2010. Applicants: Koichi Magai, et al.
C. Harris et al., "A Combined Corner and Edge Detector", In Alvey Vision Conference, pp. 147-152 (1988).
J.J. Koenderink et al.,"Representation of Local Geometry in the Visual System", Biological Cybernetics, vol. 55, pp. 367-375 (1987).

* cited by examiner

*Primary Examiner* — Tony Mahmoudi
*Assistant Examiner* — Muluemebet Gurmu
(74) *Attorney, Agent, or Firm* — Fitzpatrick, Cella, Harper & Scinto

(57) ABSTRACT

An image search apparatus extracts a symmetric partial image based on acquired pairs of feature points, and divides the partial image at a symmetry axis of the partial image to decide two partial areas, as a first area and a second area based on the tendency of image features in the partial image. In determining the similarity between the query image and a comparison destination image, a coordinate transformation coefficient for a coordinate transformation process is set based on pairs of feature points extracted from the partial area decided as the first area of the two images, the coordinate transformation process using the coordinate transformation coefficient is applied to the pairs of feature points extracted from areas including areas other than the first area of the two images, and coordinates of the pairs of feature points after the coordinate transformation process are compared.

11 Claims, 21 Drawing Sheets

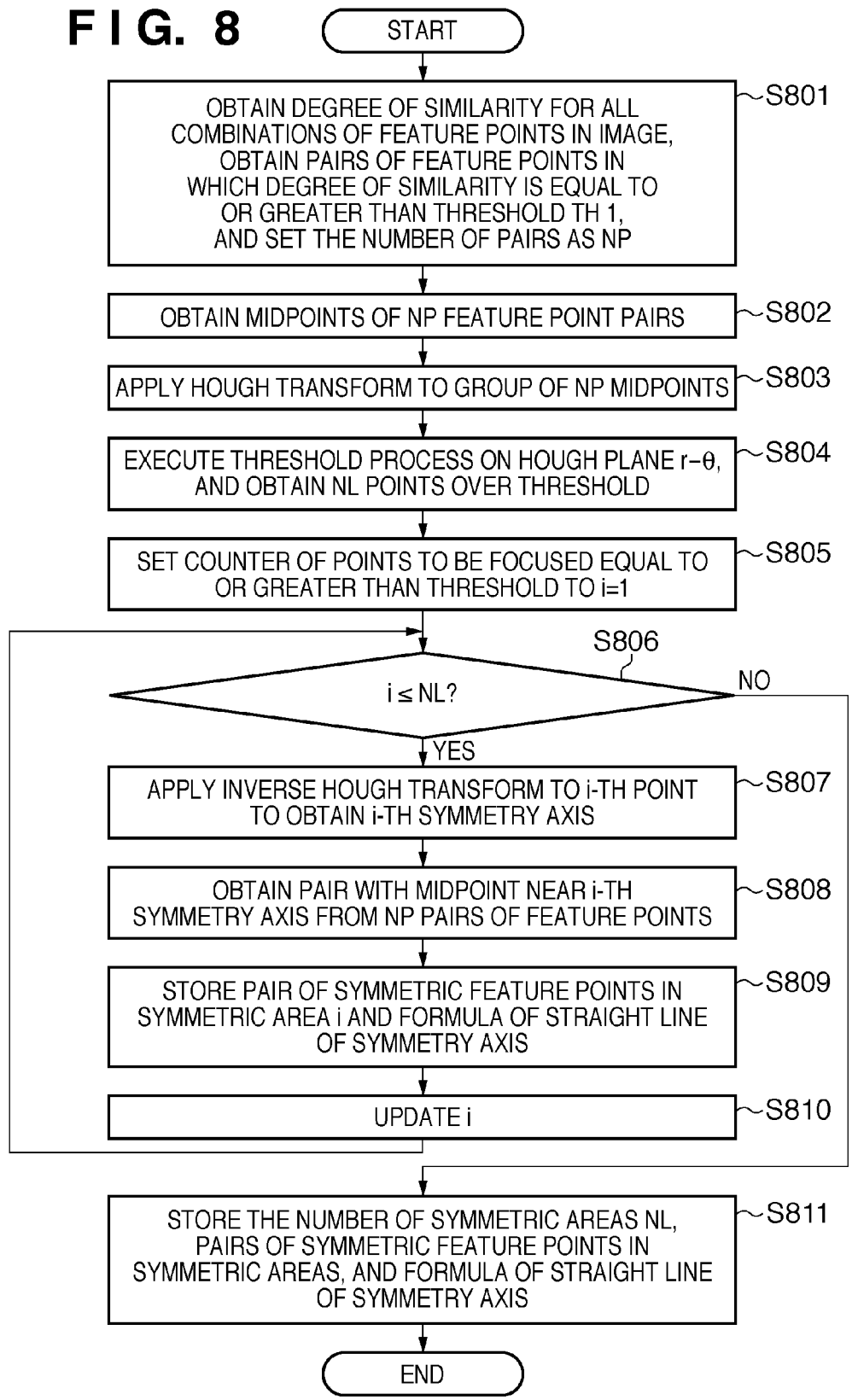

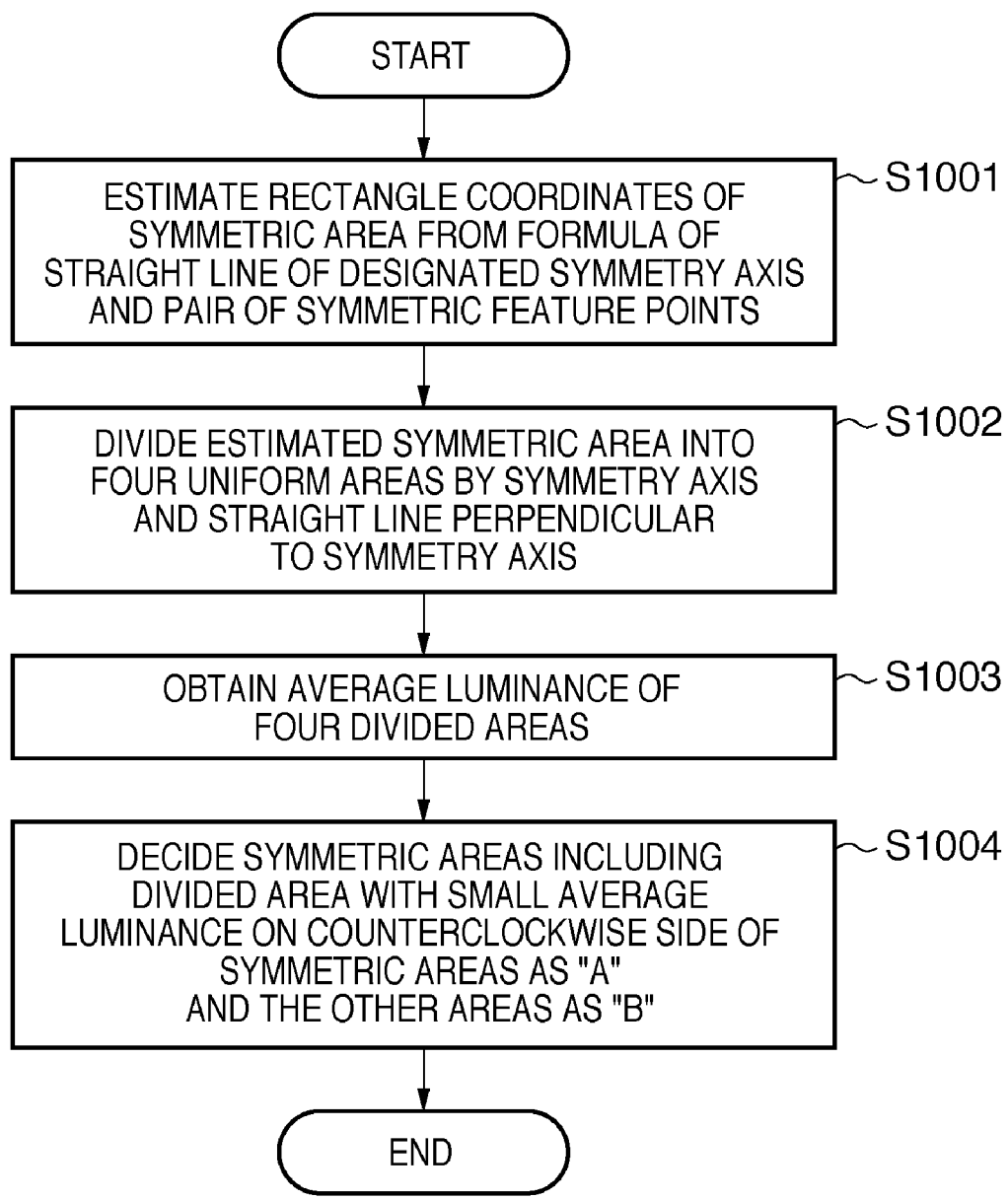

FIG. 12
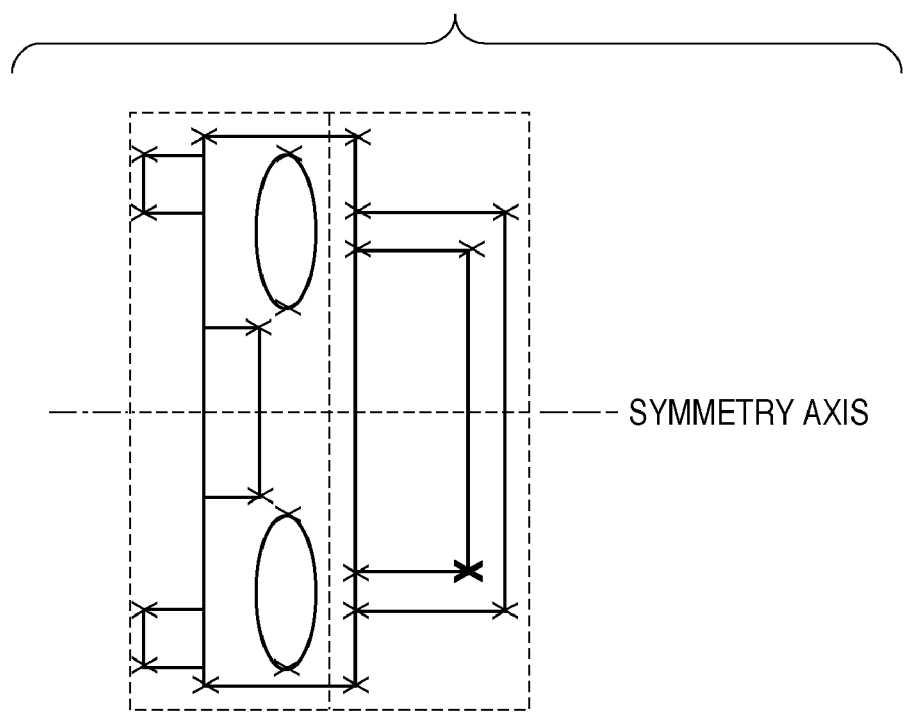
— SYMMETRY AXIS
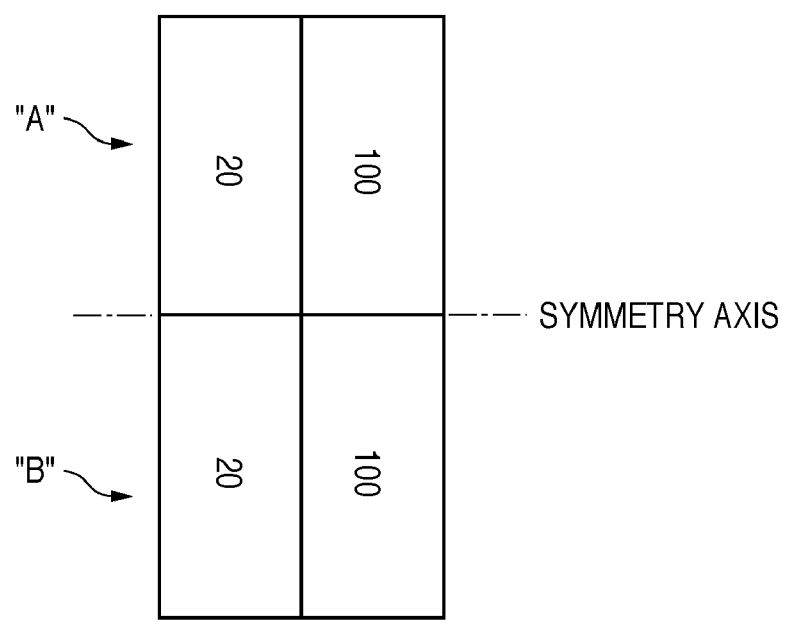
— SYMMETRY AXIS

FIG. 13
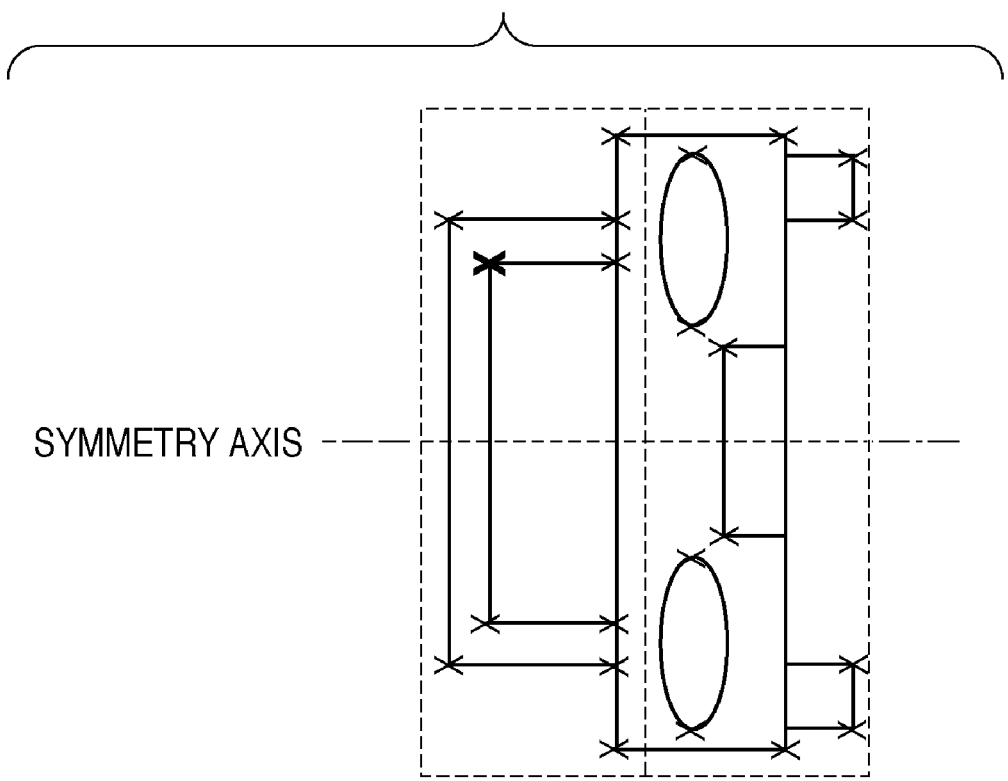
SYMMETRY AXIS
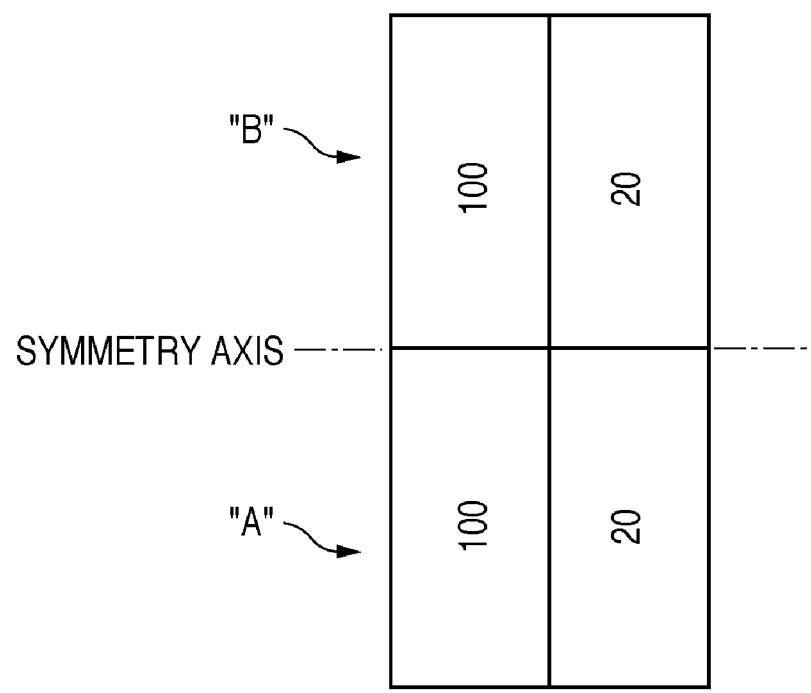
SYMMETRY AXIS

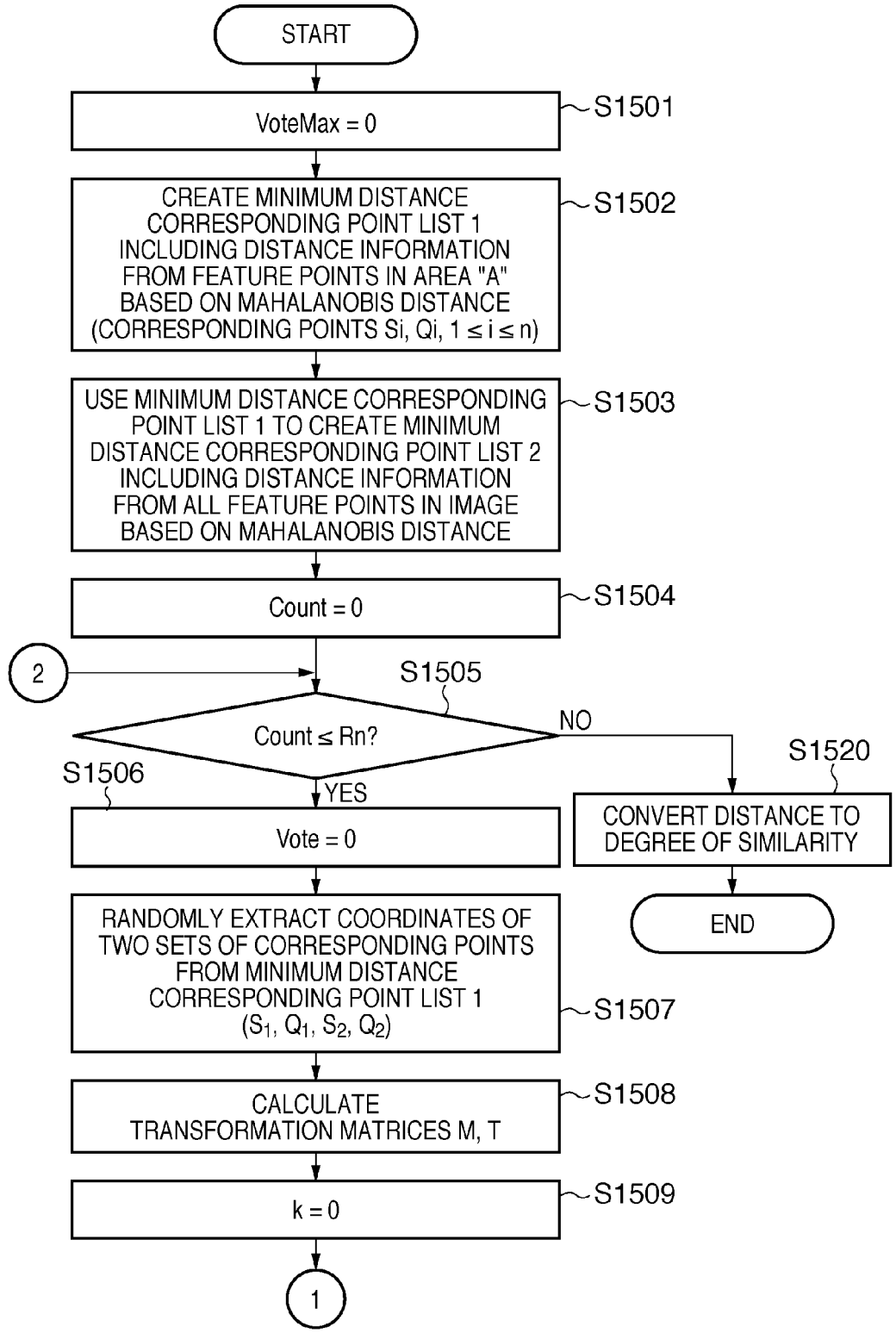

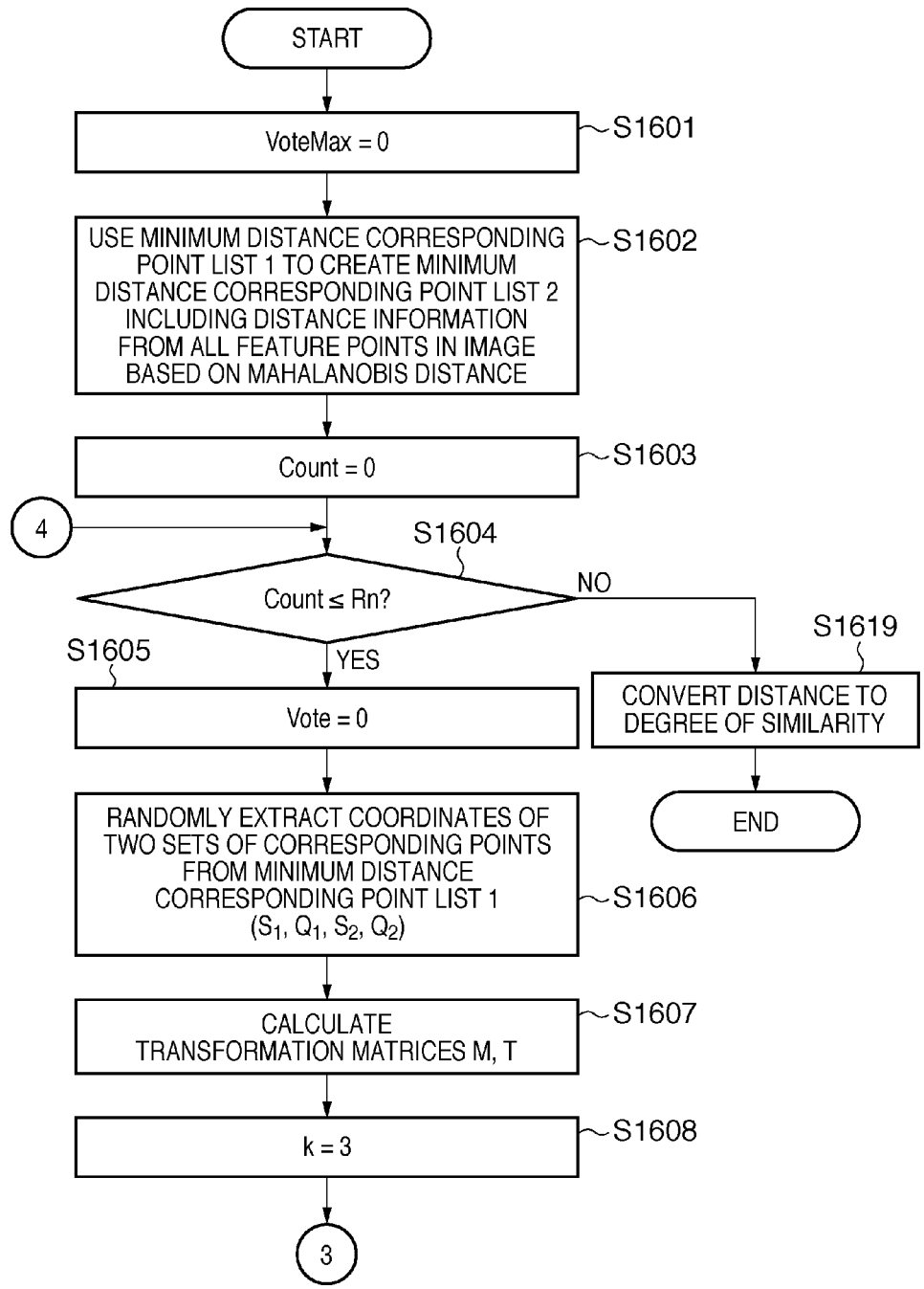
F I G. 16A

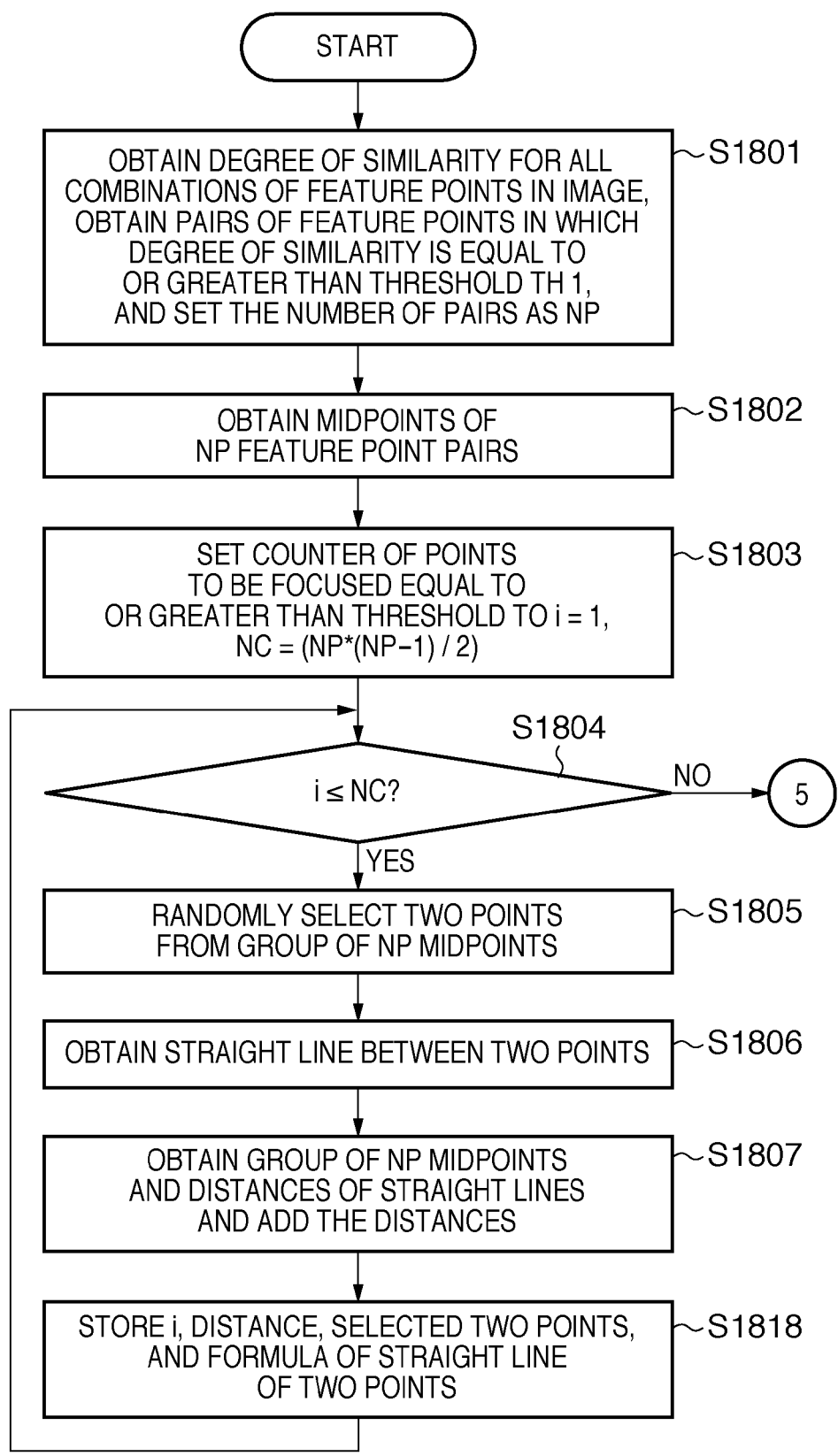

IMAGE SEARCH APPARATUS AND METHOD THEREOF

BACKGROUND OF THE INVENTION

1. Field of the Invention

The present invention relates to an image search technique based on the degree of similarity between feature points in images.

2. Description of the Related Art

In general, the image search corresponding to the rotation of an image is performed by obtaining a feature amount after the rotation of a query image, or by using a feature amount after rotational transform.

Japanese Patent Laid-Open No. 2006-065399 is an example of a conventionally proposed image search technique based on the degree of similarity between feature points in images. According to the document, feature points similar to a pair of feature points randomly selected from a query image are obtained from a registered image in the image search based on the comparison of local features. A geometric transformation function between the query image and the registered image is then obtained based on the positional relationship between the pair of feature points. Corresponding feature points in the registered image existing at places after the transformation of feature points other than the pair based on the geometric transformation function are counted to determine the similarity.

However, in the process, an image including a symmetric (horizontally/vertically symmetric) partial image may not be appropriately searched in the image search based on the comparison between the local features. More specifically, in a symmetric partial image, an incorrect combination of similar feature points may be extracted (a pair of similar feature points crosses symmetric areas), and the search may fail, as described later with reference to FIGS. 7A to 7C.

SUMMARY OF THE INVENTION

The present invention has been made in view of the forgoing problem, and according to an embodiment, an incorrect extraction of a combination of features points is prevented in relation to the search of an image including a geometrically symmetric part to thereby provide an image search apparatus and a method thereof with high accuracy for comparing partial images.

According to one aspect of the present invention, there is provided an image search apparatus that searches an image similar to an inputted query image from registered images, the image search apparatus comprising: an extraction unit configured to acquire a pair of feature points corresponding to each other based on a feature amount of feature points in the query image and to extract a symmetric partial image based on the acquired pair of feature points; a decision unit configured to decide two partial areas, which are obtained by dividing the partial image at a symmetry axis of the partial image, as a first area and a second area based on the tendency of image features in the partial image; a setting unit configured to extract, based on the feature amount, at least two sets of corresponding pairs of feature points from the feature points in partial areas decided as the first area of the query image and a registered comparison destination image and to set a coordinate transformation coefficient for transforming the feature points of one of the two images so that the coordinates of the extracted pairs of feature points match; and a comparison unit configured to extract pairs of feature points corresponding to each other from the feature points in the two images based on the feature amount to determine the similarity between the two images, to transform coordinates of the feature points extracted from the one of the images by a coordinate transformation process using the coordinate transformation coefficient, and to compare the coordinates of the feature points after the transformation with coordinates of the feature points in the other image of the two images.

Also, according to another aspect of the present invention, there is provided an image search method of searching for an image similar to an inputted query image from registered images, the image search method comprising: an extraction step of acquiring a pair of feature points corresponding to each other based on a feature amount of feature points from the query image and extracting a symmetric partial image based on the acquired pair of feature points; a decision step of deciding two partial areas which are obtained by dividing the partial image at a symmetry axis of the partial image, as a first area and a second area based on the tendency of image features in the partial image; a setting step of extracting, based on the feature amount, at least two sets of corresponding pairs of feature points from the feature points in partial areas decided as the first area of the query image and a registered comparison destination image and setting a coordinate transformation coefficient for transforming the feature points of one of the two images so that the coordinates of the extracted pairs of feature points match; and a comparison step of extracting pairs of feature points corresponding to each other from the feature points in the two images based on the feature amount to determine the similarity between the two images, transforming coordinates of the feature points extracted from the one of the images by a coordinate transformation process using the coordinate transformation coefficient, and comparing the coordinates of the feature points after the transformation with coordinates of the feature points in the other image of the two images.

Further features of the present invention will become apparent from the following description of exemplary embodiments with reference to the attached drawings.

BRIEF DESCRIPTION OF THE DRAWINGS

FIG. 8 shows a process for extracting a symmetric partial image according to the embodiment.

FIG. 10 shows a decision process of a label ("A"/"B") of a symmetric partial image when there is a symmetric partial area.

FIG. 12 explains a symmetric image and labeling.

FIG. 13 explains a symmetric image and labeling.

FIGS. 15A and 15B show determination processes of degree of similarity when a query image includes a symmetric partial image.

FIGS. 16A and 16B show determination processes of degree of similarity when a query image does not include a symmetric partial image.

FIGS. 18A and 18B show processes of determining the presence of symmetry of image according to a second embodiment.

DESCRIPTION OF THE EMBODIMENTS

Figure 1:
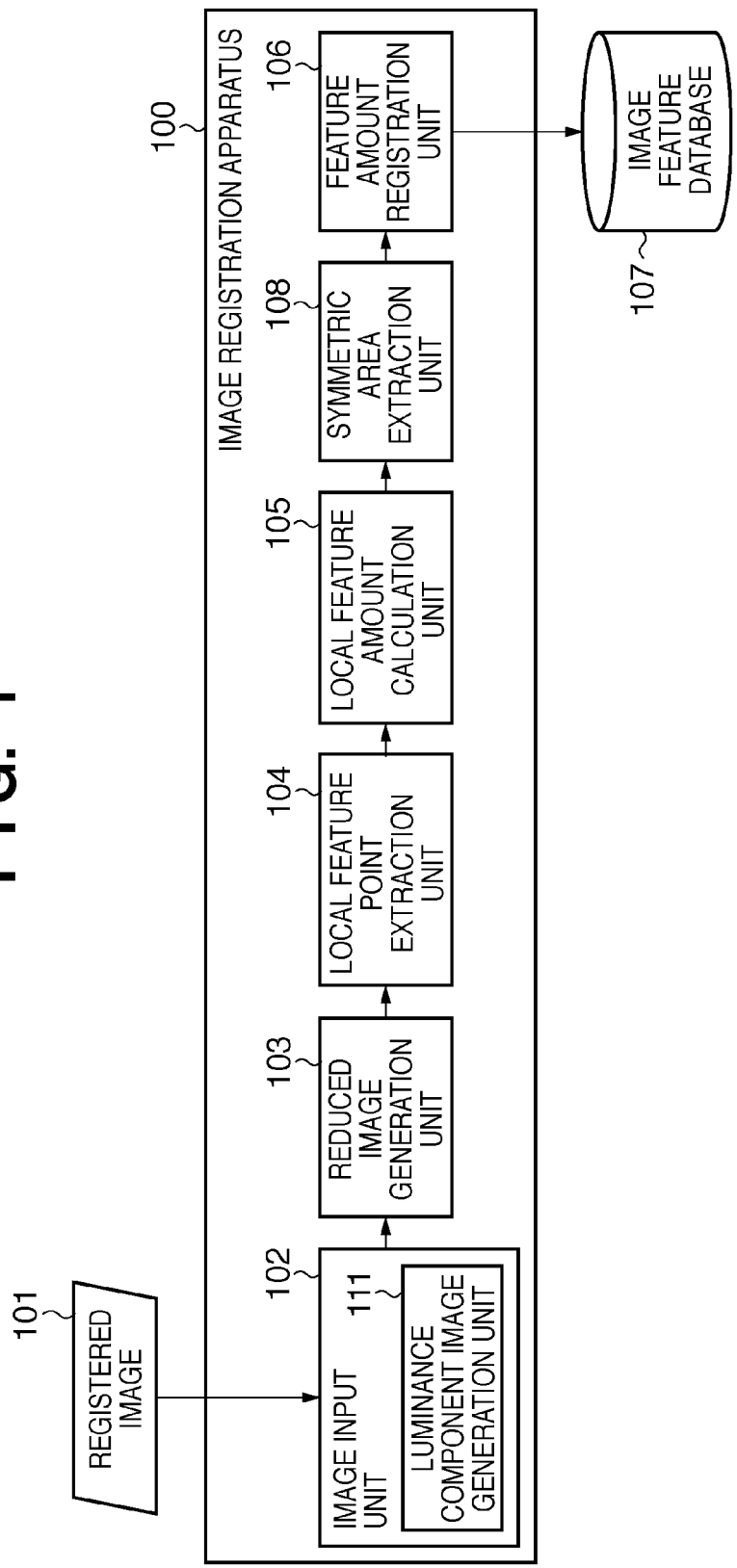
FIG. 1 is an example of configuration of an image registration apparatus according to an embodiment.

A summary of the present embodiment will be described first. Rotation-invariant feature points and rotation-invariant feature amounts (feature amounts in scale) are used in the determination of similarity between a query image and a comparison destination image in an image search apparatus of the present embodiment. A coordinate transformation coefficient for a coordinate transformation process is then decided based on coordinates of at least two pairs of corresponding feature points in the query image and the comparison destination image. An affine transform is implemented in the present embodiment, and an affine transform function is decided in the process. The affine transform is applied to the feature point coordinate in one of the query image and the comparison destination image, and the similarity of the images is determined by a comparison process of comparing the coordinates after the transformation with the coordinates of the features points in the other image.

During registration processing of the present embodiment, a first area and a second area are decided in areas divided in a symmetry axis based on the tendency of image features, in relation to partial areas with symmetric features points, in other words, symmetric partial areas, based on a feature point extraction result in a registered image. In the present embodiment, one area is labeled with "A", and the other area is labeled with "B". Each feature point is registered in an image feature database along with information indicating that the feature point is in a symmetric image area and that the feature point belongs to "A" or "B". On the other hand, feature points outside the symmetric area in the registered image are registered in the image feature database along with information indicating that the feature points are not in the symmetric area.

During the search processing of the present embodiment, the presence of a symmetric partial area is determined based on the feature points extracted from the query image. If there is a symmetric partial area, at least two feature points are selected from an area with "A" in a pair of symmetric areas "A" and "B", and corresponding feature points are obtained from an area with "A" in the comparison destination image. The feature points are used to decide the affine transform function. As a result, corresponding feature points can be estimated from the same side of the symmetric shape.

A coordinate transformation process of the feature points is executed based on the decided affine transform function, and the comparison process is executed. The target feature points are included in areas other than the areas set to "A" in the query image and the comparison destination image. For example, the area set to "B" and an asymmetric area other than the symmetric area are included.

In this way, feature points for deciding the affine transform function are selected from the areas set to "A" in the query image and the comparison destination image. As a result, pairs of feature points can be selected from correct corresponding symmetric areas, and the adverse effect caused by the symmetry can be reduced. Therefore, the combination of similar feature points can be made appropriate in relation to the search of an image including a geometrically symmetric part.

Obviously, a normal comparison process is executed if there is no symmetric area (symmetric partial image) after the search for the presence of partial area with symmetric feature points based on the feature point extraction result in the query image.

In the following embodiments, the detection of symmetric area is realized by checking that the midpoint group of similar feature point pairs in the image straightly aligns, setting the straight line as a symmetry axis, and obtaining a feature point pair including the midpoint near the symmetry axis.

For example, a Hough transform is applied to the midpoint group of similar feature point pairs in the image to obtain the symmetry axis, and a feature point pair including the midpoint near the symmetry axis is obtained to thereby realize more precise detection of symmetric area.

In the decision of area "A" and "B" when there is a symmetric area, the deviation of image features can be used to surely decide "A" and "B". Image features specific to the area, such as the number of feature points and pixel gradation average in the area, can be used as the image features. For example, the result can be used to set a rule such as to decide the left half or the right half as "A" when the symmetric partial image is rotated so that image features with larger or smaller deviation are on the upper or lower side.

Meanwhile, when an image includes a symmetric area, metadata "symmetric area exists" can be provided to the image, and a narrow-down search can be executed in which only an image with symmetric area is searched when the query image is a symmetric image.

FIG. 1 is a block diagram showing an example of configuration of an image registration apparatus according to a first embodiment of the present invention. In FIG. 1, an image registration apparatus 100 comprises an image input unit 102, a reduced image generation unit 103, a local feature point extraction unit 104, a local feature amount calculation unit 105, a symmetric area extraction unit 108, and a feature amount registration unit 106. Reference numeral 101 denotes a registered image, which is an image registered by the image registration apparatus 100 in an image feature database described below. Reference numeral 107 denotes an image feature database, to which the image registration apparatus 100 registers image features extracted from the registered image 101.

Figure 2:
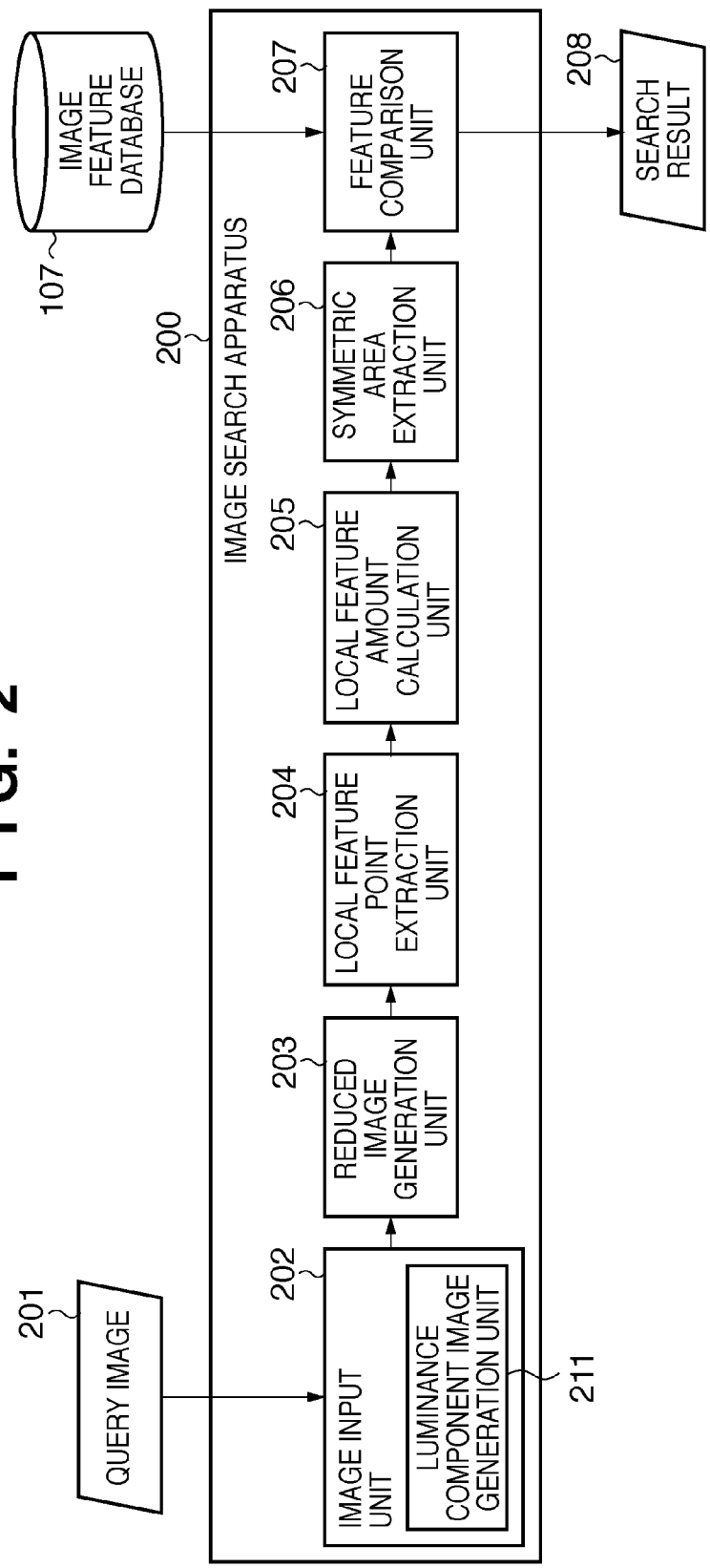
FIG. 2 is an example of configuration of an image search apparatus according to the embodiment.

FIG. 2 is a block diagram showing an example of configuration of an image search apparatus according to the first embodiment of the present invention. In FIG. 2, an image search apparatus 200 comprises an image input unit 202, a reduced image generation unit 203, a local feature point extraction unit 204, a local feature amount calculation unit 205, a symmetric area extraction unit 206, and a feature comparison unit 207. Reference numeral 201 denotes a query image. The image search apparatus 200 searches an image similar to the query image 201 from the image feature database 107. Reference numeral 208 denotes a search result image, which is an image outputted as a result of the search of the image feature database 107 by the image search apparatus 200.

Examples of operations of the image registration apparatus 100 and the image search apparatus 200 according to the present embodiment configured as described above will now be described.

[Registration Processing of Image]

Figure 3:
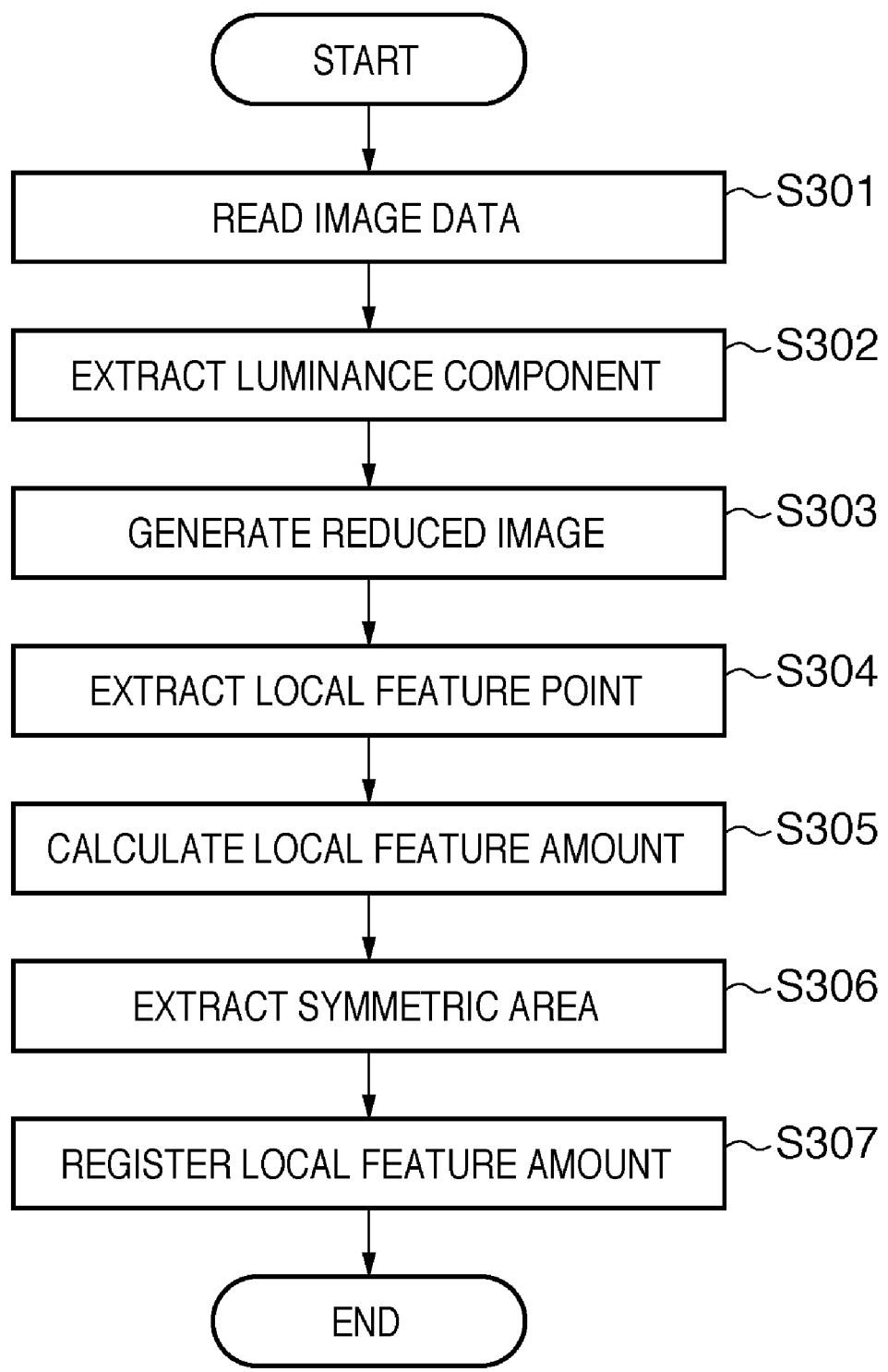
FIG. 3 shows registration processing of image according to the embodiment.

Registration processing of image executed by the image registration apparatus 100 will be described first. FIG. 3 is a flow chart showing a procedure of the registration processing of image. In step S301, the image input unit 102 reads the registered image 101. In step S302, a luminance component image generation unit 111 of the image input unit 102 extracts a luminance component from the registered image 101 to generate a luminance component image and transmits the luminance component image to the reduced image generation unit 103. The image input unit 102 transmits the registered image 101 to the feature amount registration unit 106.

Figure 5:
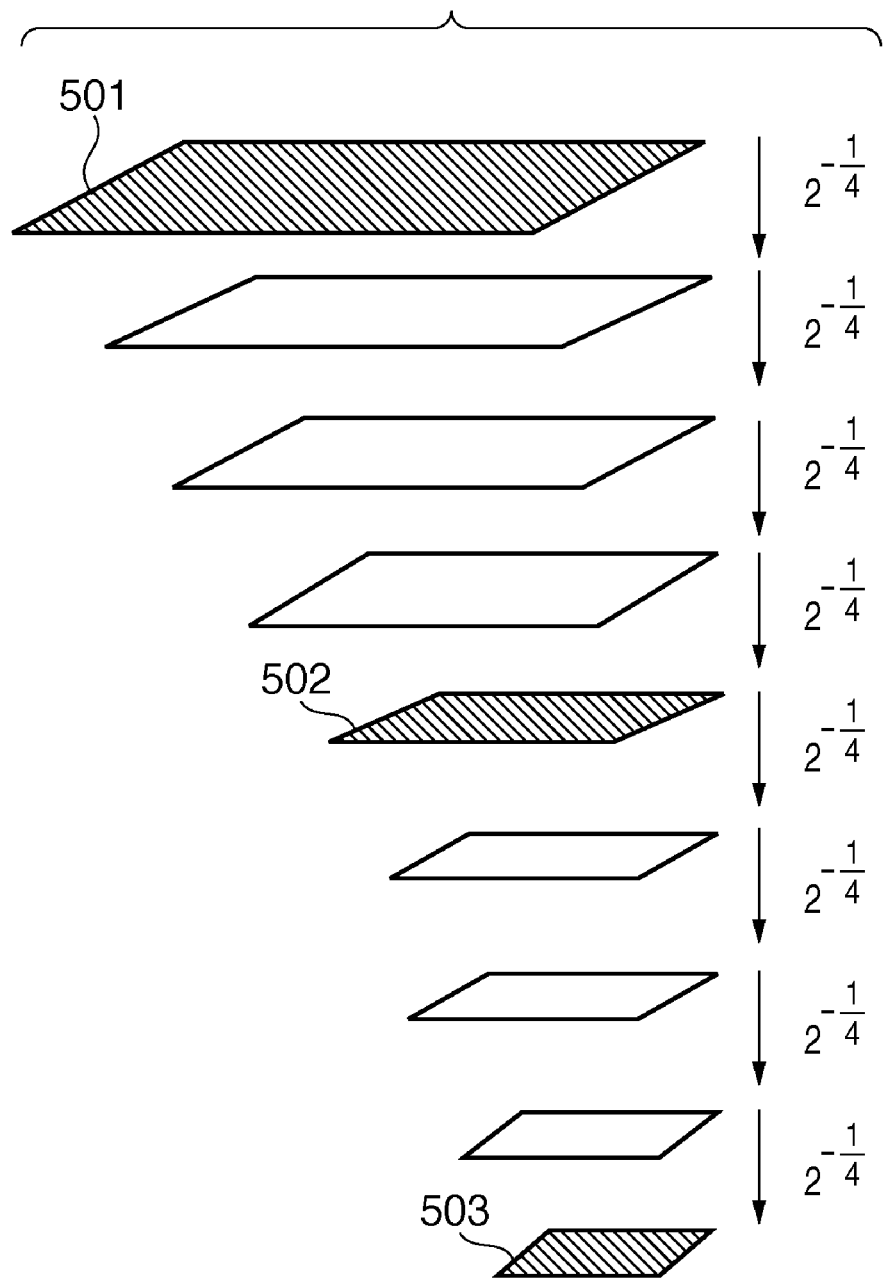
FIG. 5 shows an example of reduced image generation.

In step S303, the reduced image generation unit 103 sequentially reduces the luminance component image transmitted from the image input unit 102 in accordance with a magnification p to generate n reduced images and transmits the generated reduced images to the local feature point extraction unit 104. However, the magnification p and the number of reduced images n are determined in advance. FIG. 5 is a diagram showing an example of the reduced image generation and shows an example of reduced images generated by the reduced image generation unit 103 when the magnification p is 2 to the −1/4 power, and the number of reduced images n is 9. In FIG. 5, reference numeral 501 denotes a luminance component image transmitted from the image input unit 102, reference numeral 502 denotes a reduced image reduced four times from the luminance component image in accordance with the magnification p, and reference numeral 503 denotes a reduced image reduced eight times from the luminance component image in accordance with the magnification p. In the example of FIG. 5, the reduced image 502 is an image in which the luminance component image transmitted from the image input unit 102 is reduced to 1/2, and the reduced image 503 is an image in which the luminance component image transmitted from the image input unit 102 is reduced to 1/4. Although the reduced images according to the present embodiment are generated by a reduction method based on linear interpolation, other reduction methods may also be used.

In step S304, the local feature point extraction unit 104 extracts feature points, which are robustly extracted even if the image is rotated (rotation-invariant feature points), from each of the n reduced images transmitted from the reduced image generation unit 103. The local feature point extraction unit 104 then transmits the extracted rotation-invariant feature points to the local feature amount calculation unit 105. In the present embodiment, a Harris operator is used as an extraction method of the rotation-invariant feature points (C. Harris and M. J. Stephens, "A combined corner and edge detector," In Alvey Vision Conference, pages 147-152, 1988). Specifically, for a pixel on an output image H obtained by an action of the Harris operator, pixel values of the pixel and eight pixels around the pixel (nine pixels in total) are checked. The point in which the pixel is a local maximum (the pixel in the nine pixels with the maximum pixel value) is extracted as a rotation-invariant feature point. Even if the pixel is a local maximum, the pixel is not extracted as a rotation-invariant feature amount if the value of the pixel is smaller than a threshold. Not only the feature point extraction method used in the present embodiment, but any feature point extraction method can be applied to the local feature point extraction unit 104 as long as the rotation-invariant feature points can be extracted.

In step S305, the local feature amount calculation unit 105 calculates a local feature amount (rotation-invariant local feature amount), which is invariant after the rotation of the image, of each rotation-invariant feature point transmitted from the local feature point extraction unit 104. The extracted rotation-invariant local feature amount is associated with coordinate information and transmitted to the feature amount registration unit 106. In the present embodiment, LocalJet (J. J. Koenderink and A. J. van Doorn, "Representation of local geometry in the visual system," Riological Cybernetics, vol. 55, pp. 367-375, 1987) and a combination of derivatives of LocalJet are used as a calculation method of the rotation-invariant feature amount. Specifically, a rotation-invariant feature amount shown in Formula (1) is calculated.

$$v = \begin{pmatrix} L \\ L_x L_x + L_y L_y \\ L_{xx} L_x L_x + 2 L_{xy} L_x L_y + L_{yy} L_y L_y \\ L_{xx} + L_{yy} \\ L_{xx} L_{xx} + 2 L_{xy} L_{xy} + L_{yy} L_{yy} \end{pmatrix} \quad (1)$$

Symbols used on the right side of Formula (1) are defined by Formulas (2) to (7) shown below. Formula (2) is a convolution operation of a Gaussian function and an image.

$$L = G(x, y) * I(x, y) b \quad (2)$$

$$L_x = \frac{\partial L}{\partial x} \quad (3)$$

$$L_y = \frac{\partial L}{\partial y} \quad (4)$$

$$L_{xy} = \frac{\partial^2 L}{\partial x \partial y} \quad (5)$$

$$L_{yy} = \frac{\partial^2 L}{\partial y^2} \quad (6)$$

$$L_{xx} = \frac{\partial^2 L}{\partial x^2} \quad (7)$$

Not only the feature amount calculation method used in the present embodiment, but any feature amount calculation method can be applied to the local feature amount calculation unit 105 as long as the rotation-invariant feature amount can be calculated.

Figure 4:
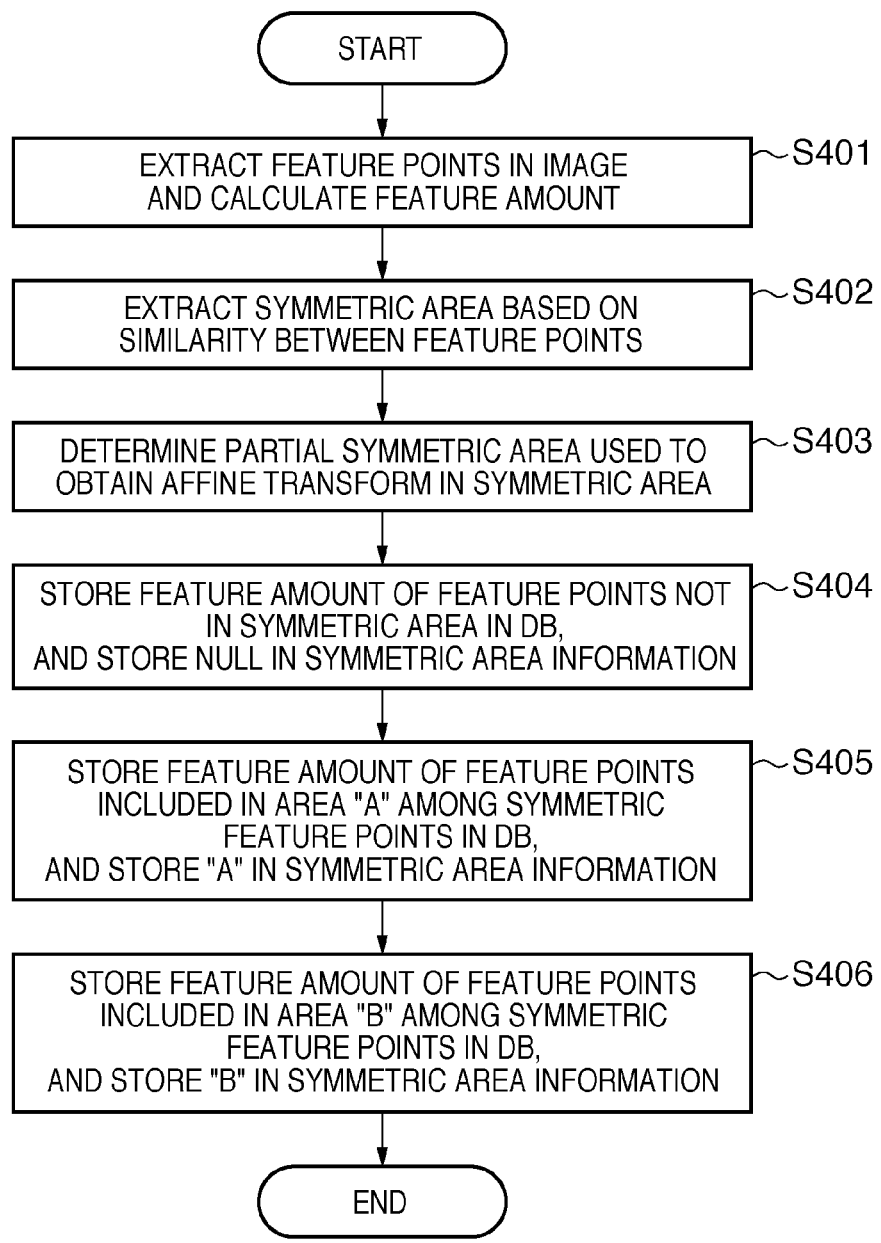
FIG. 4 shows a process related to registration of a local feature amount.

In step S306, the symmetric area extraction unit 108 uses local feature points and local feature amounts of the local feature points to extract a symmetric partial image (symmetric area) from the registered image 101. In step S307, the feature amount registration unit 106 associates the rotation-invariant feature amount transmitted from the local feature amount calculation unit 105 with the registered image 101 transmitted from the image input unit 102 and registers the data in the image feature database 107. At this point, the feature amount registration unit 106 classifies the feature points registered in the image feature database 107 based on the symmetric area transmitted from the symmetric area extraction unit 108. Hereinafter, a process of extracting symmetric partial areas from an image based on the similarity between feature points (step S306) and a process of registering the symmetric partial areas (step S307) will be described with reference to the flow chart of FIG. 4.

The extraction of the feature points in the image and the calculation of the feature amount shown in step S401 are equivalent to the processes of steps S304 and S305. In step S402, the symmetric area extraction unit 108 extracts symmetric areas based on the similarity between the feature points. The process of step S402 will be described in detail later with reference to the flow chart of FIG. 8. In step S403, the symmetric area extraction unit 108 decides partial symmetric areas used to obtain an affine transform coefficient in the symmetric areas extracted in step S402. Hereinafter, an object of the process will be described with reference to FIG. 7. Details of the process of step S403 will be described in detail later with reference to the flow chart of FIG. 8.

Figure 7A:
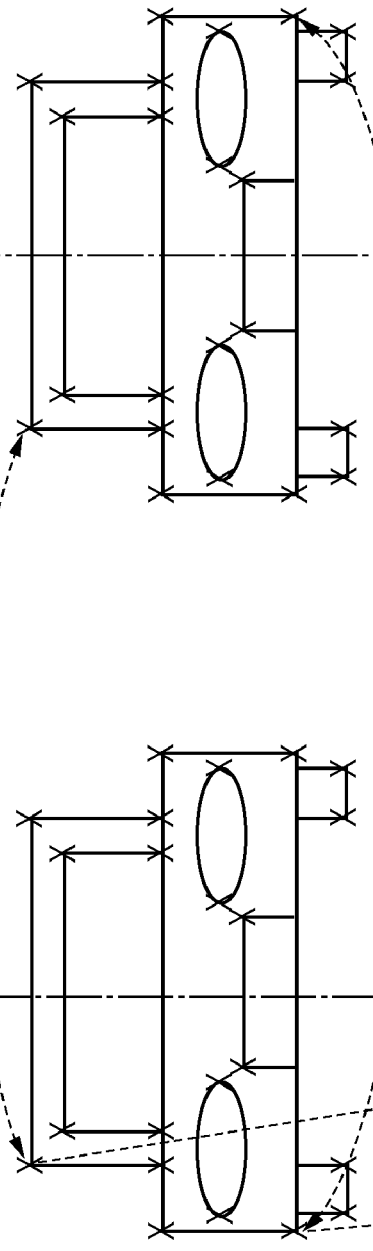
FIGS. 7A, 7B, and 7C explain an example of an adverse effect when a symmetric image is searched.
Figure 7B:
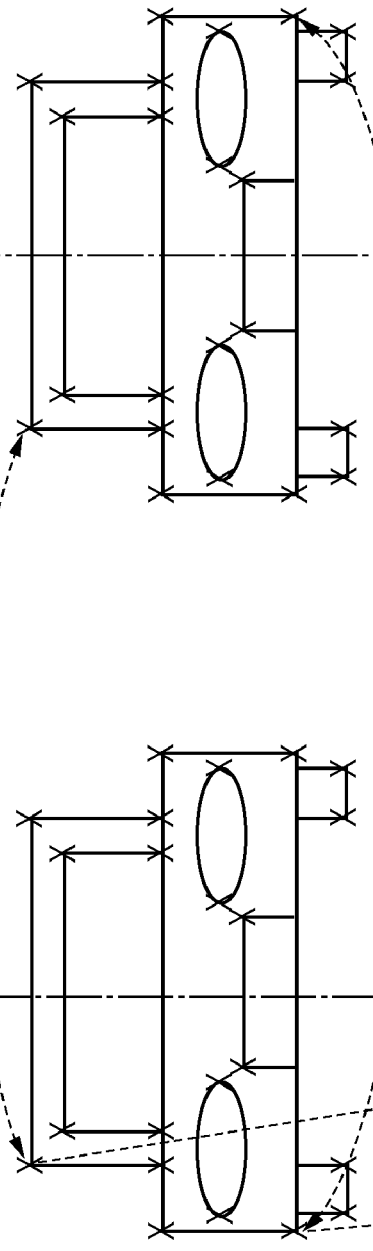
Figure 7C:
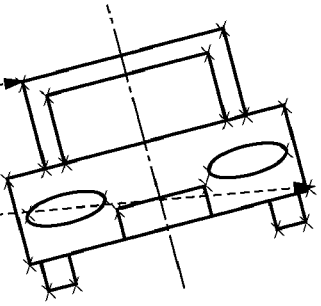

FIG. 7A shows a query image, and FIG. 7B shows a comparison destination image to be compared. Two points are selected from the query image, and feature points similar to the points are decided from the comparison destination image of FIG. 7B. Since the images shown in FIGS. 7A and 7B are horizontally symmetric, a feature point may be selected from an area on the opposite side of the symmetry axis in the comparison destination image as a feature point corresponding to the feature point at the lower left corner of FIG. 7A. When an attempt is made to set the same rotation state and enlargement/reduction ratio to the images based on the wrongly selected two points, an incorrect transformation as shown in FIG. 7C is performed. To prevent this, the feature points selected from the query image of FIG. 7A and the feature points selected from the comparison destination image of FIG. 7B need to be extracted from the same side of the symmetric areas to decide the affine transform. Hereinafter, a first area as one of the symmetric areas will be referred to as "A", and the other second area will be referred to as "B".

In step S404, the feature amount registration unit 106 stores the feature amount of the feature points in an asymmetric area other than the symmetric areas in the image feature database 107. In relation to the feature points and the feature amount to be stored here, "NULL" is stored as symmetric area information. In step S405, the feature amount registration unit 106 stores the feature amount of the feature points included in the area "A" among the feature points in the symmetric areas in the database 107. In relation to the feature points and the feature amount stored here, "A" is stored as symmetric area information. In step S406, the feature amount registration unit 106 stores the feature amount of the feature points included in the area "B" among the symmetric feature points in the database 107. In relation to the feature points and the feature amount to be stored here, "B" is stored as symmetric area information.

In the present embodiment, the symmetric area information stored in the database 107 is used to limit the selection of a pair of feature points used to obtain a coefficient of affine transform in the image search. This will be described in detail in [Search Processing of Image].

The extraction process of symmetric areas (steps S402 and S403) will now be described with reference to FIG. 8.

In step S801, the symmetric area extraction unit 108 obtains the degree of similarity for all combinations of the feature points in the images, and pairs of feature points in which the degree of similarity is equal to or greater than a threshold TH 1 are obtained. In the present example, the number of pairs is referred to as NP. High-quality possible pairs of similar feature points are created by the threshold process.

In step S802, the symmetric area extraction unit 108 obtains midpoints of the pairs of NP feature points extracted in step S801 and provides an average pixel value of the two feature points to the midpoint. In step S803, the symmetric area extraction unit 108 applies Hough transform to the midpoint group obtained from the plurality of pairs of feature points. A known Hough transform can be used, and a method is generally used to detect straight line components on the image. The object of the process is to obtain a straight line made of the midpoints, in other words, a straight line of a symmetry axis.

Hereinafter, an outline of the Hough transform according to the present embodiment will be described with reference to FIGS. 9A and 9B. In FIG. 9A, there are three points $P_1$, $P_2$, and $P_3$ on an X-Y plane, and $P_2$ will be focused now.

A perpendicular line is drawn to the straight line from the origin. When the length is referred to as $\rho$, and the angle formed by the line and the X axis is referred to as $\theta$, $$\rho = x \cos \theta + y \sin \theta$$

can be obtained. In this way, a straight line is set if a point ($\rho$, $\theta$) is determined in the polar coordinate system. The point ($\rho$, $\theta$) will be called a Hough transform of a straight line y=ax+b. A set of straight lines with different inclinations that pass through a point ($x_0$, $y_0$) of the x-y coordinate system can be expressed as $$\rho = x_0 \cos \theta + y_0 \sin \theta.$$

Figure 9B:
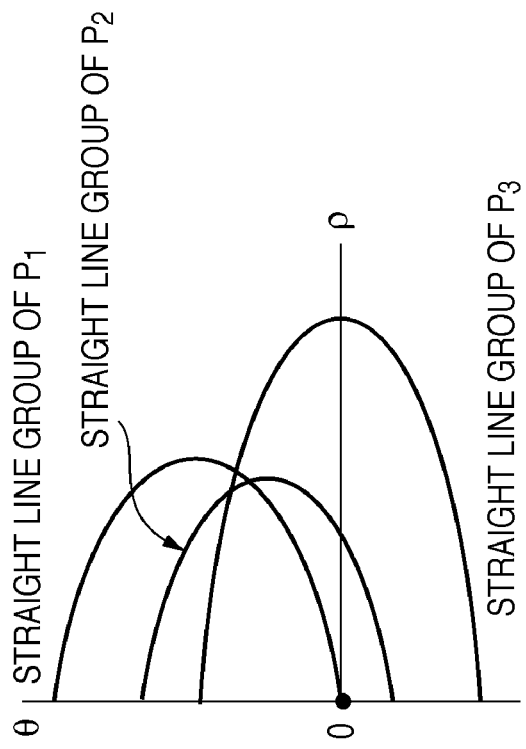
FIGS. 9A and 9B explain a principle of Hough transform.
Figure 9A:
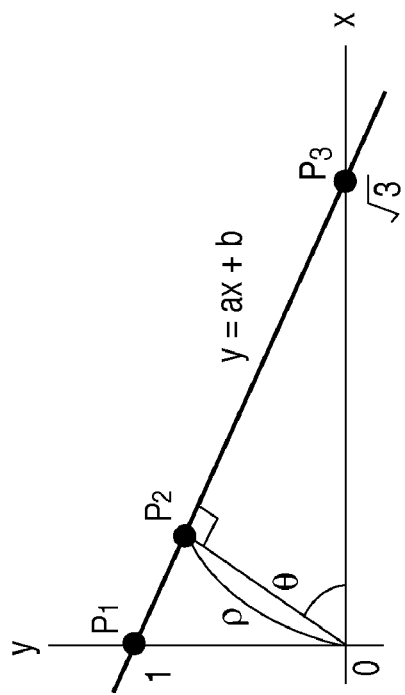

FIG. 9B shows a graph in which loci of straight line groups passing through three points shown in FIG. 9A are drawn on the $\rho$-$\theta$ plane. The values of $\rho$ and $\theta$ are the same if the three points are on the same straight line, and the loci on the $\rho$-$\theta$ plane corresponding to the three points intersect at one point. This principle can be used to verify whether the midpoints of the pairs of feature points are on the straight line (symmetry axis).

In step S804, the symmetric area extraction unit 108 applies a threshold process to the number of intersections of curves at the points on the Hough plane $\rho$-$\theta$ and obtains NL points that area over the threshold. The process is based on the assumption that the points with high values are intersections of curves indicating the straight line passing through the midpoints. A straight line constituting a plausible symmetry axis is obtained by the threshold process.

In step S805, the symmetric area extraction unit 108 sets a first point to be focused from the points above the threshold obtained in step S804. In step S806, if the process is not finished for all points above the threshold, the process diverges to step S807. If the process is finished for all points above the threshold, the number of symmetric areas NL as well as the pairs of symmetric feature points in the symmetric areas and the formula of the straight line of the symmetry axis are stored in step S811, and the process ends.

In step S807, the symmetric area extraction unit 108 applies an inverse Hough transform to an i-th point to obtain an i-th symmetry axis. In step S808, the symmetric area extraction unit 108 obtains a pair including the midpoint near the i-th symmetry axis from the NP pairs of feature points.

In step S809, the symmetric area extraction unit 108 stores pairs of symmetric feature points in a symmetric area i and the formula of the straight line of the symmetry axis. In step S810, the symmetric area extraction unit 108 increments i to switch the point over the threshold to be focused to the next point. The process then returns to step S806.

According to the process, a plurality of symmetric areas can be obtained from the image, and pairs of symmetric feature points can be further obtained.

A method of deciding two partial areas, which are obtained by dividing a symmetric partial image at the symmetry axis, as a first area ("A") and a second area ("B") will be described with reference to FIG. 10. In the present embodiment, the first area and the second area are decided based on the tendency of image features in the symmetric partial image.

In step S1001, the symmetric area extraction unit 108 estimates rectangle coordinates of the symmetric area from the formula of the straight line of the designated symmetry axis and the pairs of symmetric feature points. More specifically, the symmetric area extraction unit 108 estimates a rectangle area that includes pairs of feature points symmetric to the designated symmetry axis and that is symmetric to the symmetry axis.

Figure 11:
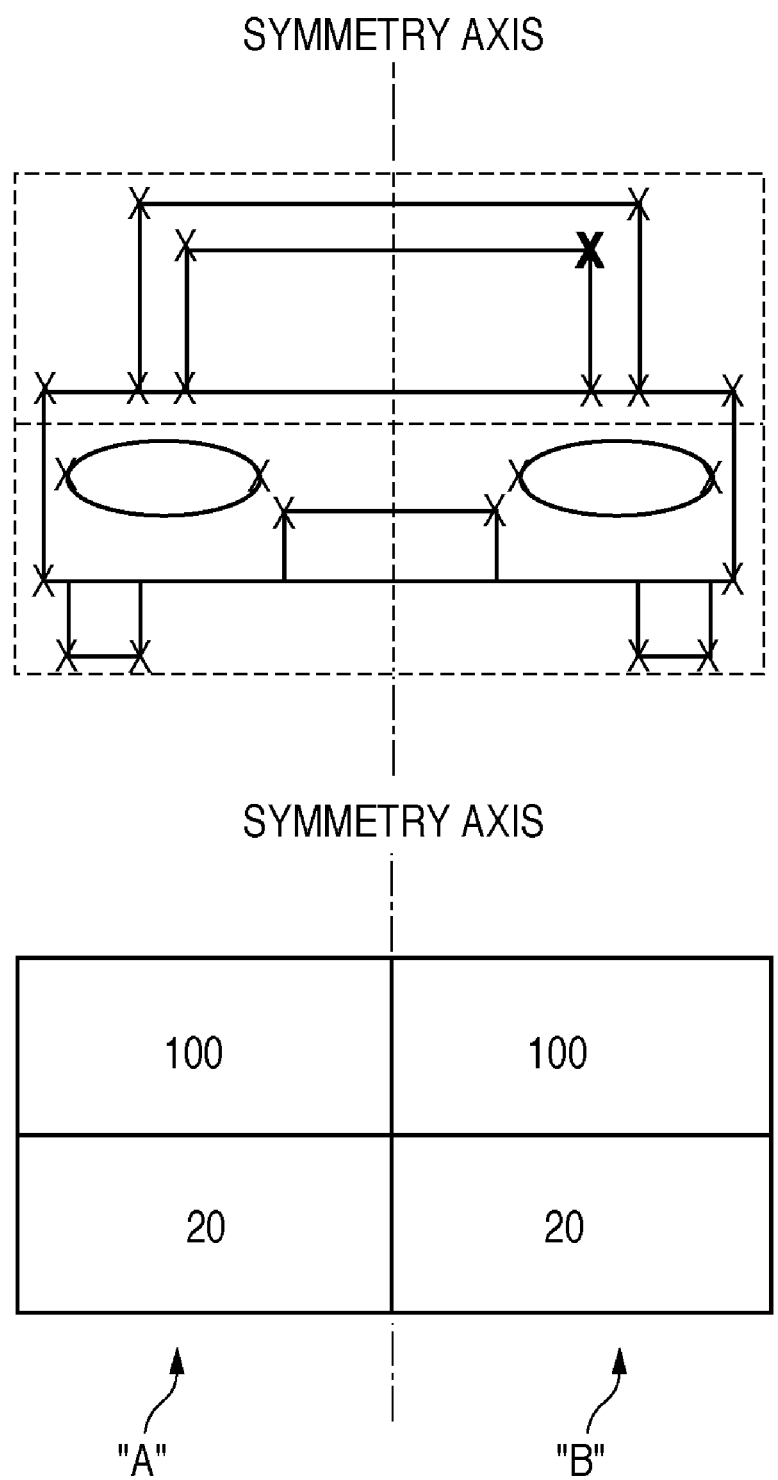
FIG. 11 explains a symmetric image and labeling.

In step S1002, the symmetric area extraction unit 108 divides the estimated rectangle of the symmetric area into four uniform areas based on the symmetry axis and a straight line perpendicular to the symmetry axis as shown in FIG. 11.

In step S1003, the symmetric area extraction unit 108 obtains an average luminance of each of the four divided areas. In step S1004, one of symmetric areas including a divided area with small average luminance on the counterclockwise side of the symmetric areas among the four divided areas is decided as "A", and the other symmetric area is decided as "B". For example, as shown in FIG. 11, an area including a divided area with small average luminance (luminance value=20) on the counterclockwise side is decided as "A", and an area including a divided area with small average luminance on the clockwise side is decided as "B". In this way, according to the process, two partial areas divided by the symmetry axis are labeled "A" and "B", respectively, based on the direction of concentration gradient in the two partial areas.

Obviously, a divided area with large average luminance can be selected, and in a word, it is sufficient if a consistent selection of divided area is possible. Other than the average luminance, it is obvious that other feature amounts can also be used such as by focusing on the number of feature points included in the areas. Therefore, two partial areas obtained by dividing a symmetric partial image at the symmetry axis are labeled as the first area ("A") and the second area ("B") based on the tendency of the image features in the partial image or the partial areas.

In this way, the pair of areas in the symmetric area are decided as "A" and "B". As a result, for example, a partial symmetric area to be focused can be surely decided even if the area is rotated 90 degrees clockwise as shown in FIG. 12, or even if the area is rotated 90 degrees counterclockwise as shown in FIG. 13.

After the decision of "A" and "B", the feature amount registration unit 106 associates the rotation-invariant feature amount transmitted from the local feature amount calculation unit 105 in step S306 with the registered image 101 transmitted from the image input unit 102 and registers the data in the image feature database 107. This completes the image registration processing.

[Search Processing of Image]

Figure 6:
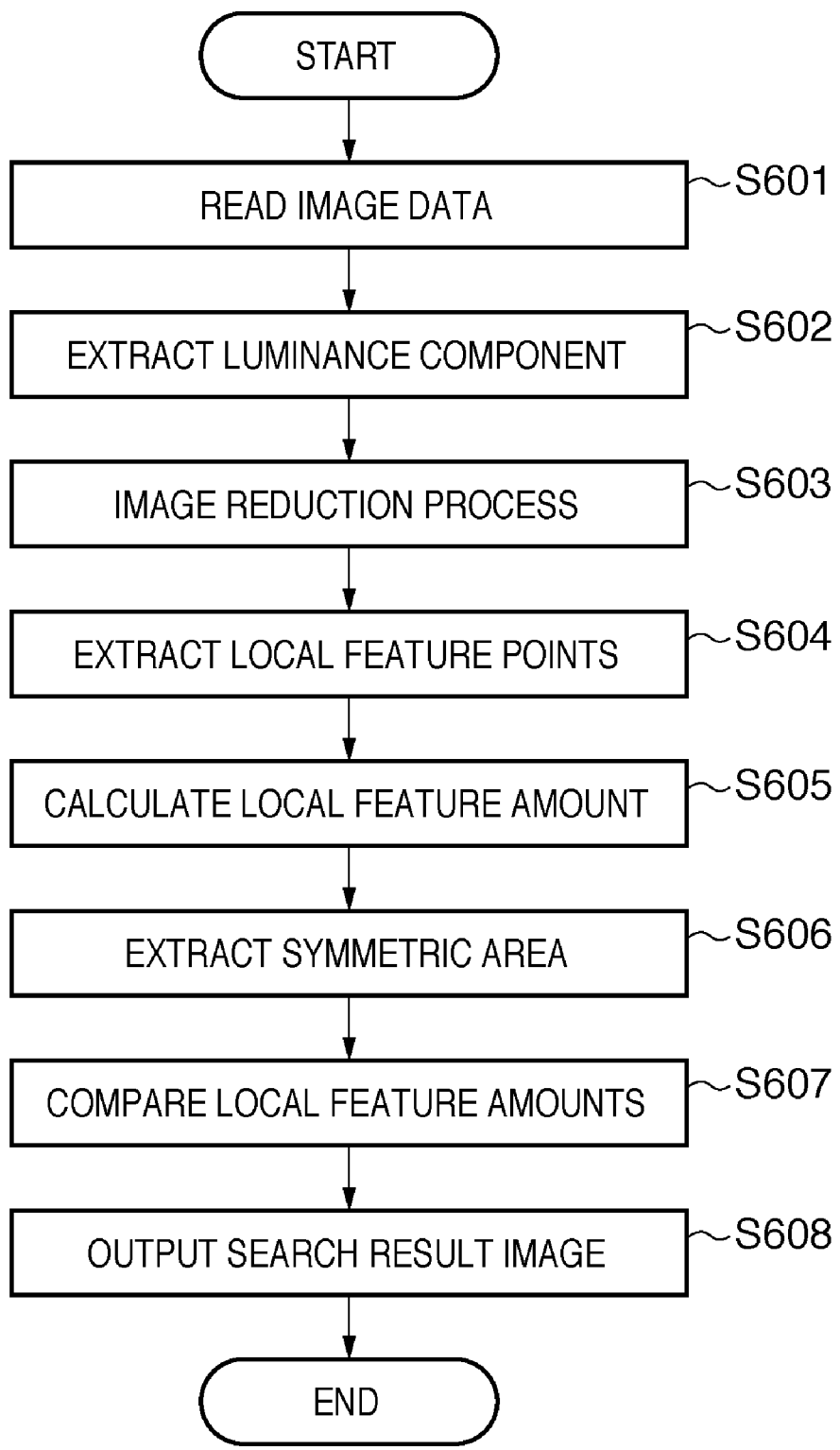
FIG. 6 shows search processing of image according to the embodiment.

Operations of units performed in the image search will now be described. FIG. 6 is a flow chart showing a procedure of search processing by the image search apparatus 200.

In the present example of processing, the processing is configured in consideration of a fluctuation in a combined local feature amount based on a scale-down transform and a rotational transform.

In step S601, the image input unit 202 (FIG. 2) reads the query image 201.

In step S602, the luminance component image generation unit 211 of the image input unit 202 extracts luminance components from the query image 201 to generate a luminance component image and transmits the generated luminance component image to the reduced image generation unit 203.

In step S603, the reduced image generation unit 203 sequentially reduces the luminance component image transmitted from the image input unit 202 in accordance with the magnification p, generates n reduced images, and transmits the reduced images to the local feature point extraction unit 204. The values of the magnification p and the number of reduced images n are the same as the values used in the registration processing of image by the image registration apparatus 100.

In step S604, the local feature point extraction unit 204 extracts feature points of image (rotation-invariant feature points) from each of the n reduced images transmitted from the reduced image generation unit 203. The extracted rotation-invariant feature points are transmitted to the local feature amount calculation unit 205. In the present embodiment, a Harris operator is used as an extraction method of the rotation-invariant feature points, as in the method used in the registration processing of image. More specifically, for a pixel on an output image H obtained by an action of the Harris operator, pixel values of the pixel and eight pixels around the pixel (nine pixels in total) are checked. The point in which the pixel is a local maximum (the pixel in the nine pixels with the maximum pixel value) is extracted as a rotation-invariant feature point. Even if the pixel is a local maximum, the feature is not extracted as a rotation-invariant feature amount if the value of the pixel is smaller than a predetermined threshold. Not only the feature point extraction method used in the present embodiment, but any feature point extraction method can be applied to the local feature point extraction unit 204 as long as the rotation-invariant feature point can be extracted.

In step S605, the local feature amount calculation unit 205 calculates a local feature amount (rotation-invariant local feature amount), which is invariant after the rotation of the image, of each rotation-invariant feature point transmitted from the local feature point extraction unit 204. The same method as the method used in the registration processing of image is used as the calculation method of the rotation-invariant feature amount. More specifically, in the present embodiment, a combination of LocalJet and derivatives of LocalJet is used to calculate the rotation-invariant feature amount shown in Formula (1).

In step S606, the symmetric area extraction unit 206 extracts a symmetric area (symmetric partial image) from the query image based on the feature points and the feature amount of the feature points acquired in steps S604 and S605. The process is the same as the process of step S306. In step S607, the feature comparison unit 207 compares the rotation-invariant feature points and the feature amount of the feature points transmitted from the local feature point extraction unit 204 and the local feature amount calculation unit 205 with the feature amount registered in the image feature database 107. The comparison is carried out for each registered image registered in the image feature database 107 with reference to the extraction result of symmetric area transmitted from the symmetric area extraction unit 206 (details will be described below). The degree of similarity is calculated for each registered image as a result of the comparison. The method of calculating the degree of similarity will be described later.

In step S607, the calculated degrees of similarity and the images, from which the degrees of similarity are calculated, are associated to create a search result list, and the degrees of similarity are sorted in descending order. Images with large degrees of similarity and the degrees of similarity of the images are outputted as the search result 208 in order of sort.

[Calculation Method of Degree of Similarity]

The comparison method (S607 of FIG. 6) of the local feature amounts according to the present embodiment will now be described with reference to the flow charts of FIGS. 14 to 16.

Figure 14:
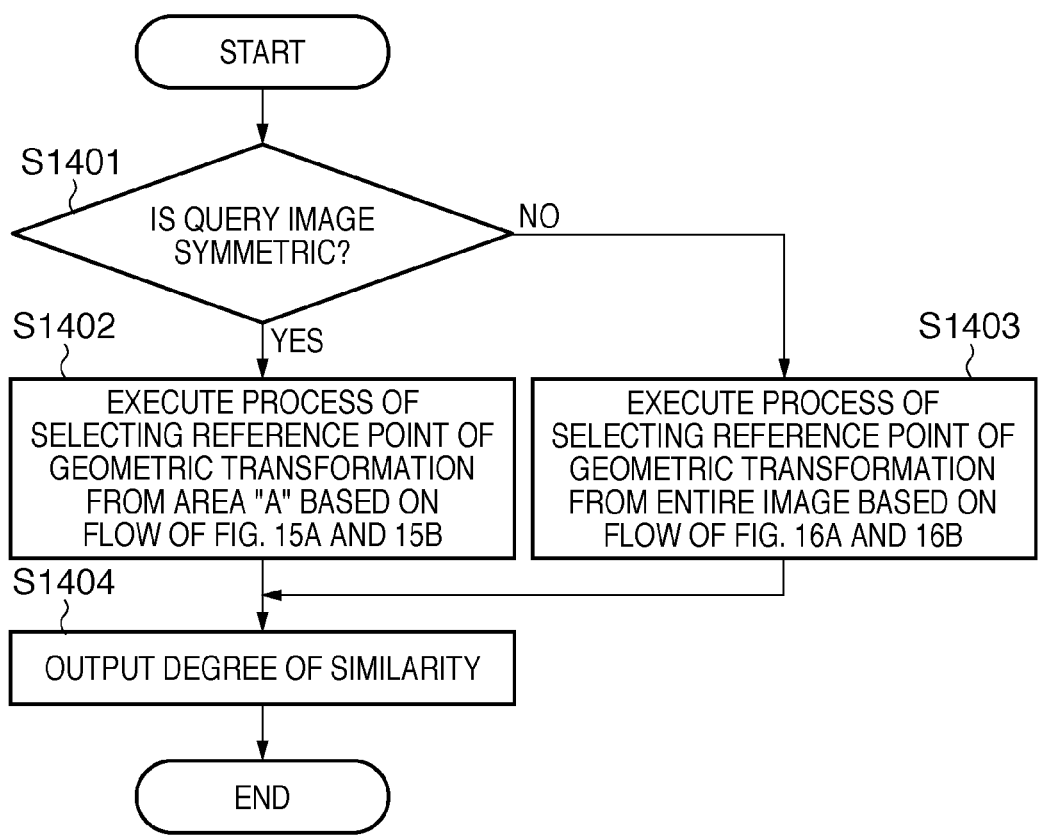
FIG. 14 explains a comparison process of local feature amounts according to the embodiment.

FIG. 14 is a flow chart showing the entire comparison process according to the present embodiment. In step S1401, the feature comparison unit 207 determines the presence of symmetry in the query image 201 (presence of symmetric area). The process of calculating the degree of similarity switches to one of steps S1402 and S1403 depending on the presence of symmetry in the query image 201. In step S1404, the feature comparison unit 207 outputs the degree of similarity obtained in one of steps S1402 and S1403.

Details of the calculation process of degree of similarity of step S1402 will now be described with reference to the flow chart of FIGS. 15A and 15B.

The rotation-invariant feature amount transmitted from the local feature amount calculation unit 205 will be referred to as Vs, and coordinates associated with the rotation-invariant feature amount will be referred to as S(x, y). The rotation-invariant feature amount on the comparison destination image R registered in the image feature database 107 will be referred to as Vq, and coordinates associated with the rotation-invariant feature amount will be referred to as Q(x', y').

Hereinafter, the calculation procedure of the degree of similarity by the feature comparison unit 207 will be described in accordance with the flow chart shown in FIGS. 15A and 15B. In the calculation of the degree of similarity, a variable VoteMax indicating the final vote count is initialized to 0 in step S1501.

In step S1502, the feature comparison unit 207 calculates the distance between the feature amount Vq included in the area "A" and the feature amount Vs included in the area "A" for all combinations of the feature amounts on the image R registered in the image feature database 107. The feature comparison unit 207 then creates a minimum distance corresponding point list 1 indicating combinations of Vq included in the area "A" of the query image 201 and Vs included in the area "A" of the comparison destination image, in which the distances between feature amounts are minimum.

In other words, if the query image is symmetric, the minimum distance corresponding point list is created only from the feature points included in the partial area "A" in the symmetric area.

In step S1503, among the rotation-invariant feature amounts Vq and Vs on the image R registered in the image feature database 107, the feature comparison unit 207 calculates the distance between feature amounts for all combinations of Vq and Vs included in the area "B" and
Vq and Vs included in asymmetric areas, and creates a minimum distance corresponding point list 2 by appending the distances to the minimum distance corresponding point list 1.

Therefore, the minimum distance corresponding point list 2 is a list in which the results of obtaining the similar feature points (corresponding feature points) are merged for each of the area "A", the area "B", and the asymmetric area. The minimum distance corresponding point list 2 is created using the minimum distance corresponding point list 1 and includes distances between feature amounts obtained from all feature points in the image.

To obtain the minimum distance corresponding points, an observed value for calculating the Mahalanobis distance stored for each feature point of the query image is set to $X=(X1, X2, \ldots, Xp)'$, and an inverse matrix $\Sigma j^{-1}$ of a variance-covariance matrix $\Sigma j$ of a population j and an average (centroid) $\mu j = (\mu 1j, \mu 2j, \ldots, \mu pj)'$ (j=1, 2, \ldots, k) are used to obtain a distance dj based on Formula (8). The minimum distance corresponding point list including the obtained distance and the variance-covariance inverse matrix is created.

$$dj^2 = (X-\mu j)'\Sigma j^{-1}(X-\mu j) \quad (8)$$

More specifically, a combination (corresponding points) of Vq and Vs is extracted so that the calculated distance between feature amounts is smaller than the threshold Tv and is a minimum distance, and the combination is registered in the minimum distance corresponding point list. Hereinafter, the rotation-invariant feature amounts of the corresponding points registered in the minimum distance corresponding point list will be referred to as Vq(k) and Vs(k), respectively, in the description of the present embodiment. Coordinates associated with Vq(k) and Vs(k) are attached by subscripts, such as $Q_k(x'_k, y'_k)$ and $S_k(x_k, y_k)$, respectively. The number of sets of the corresponding points registered in the minimum distance corresponding point list 2 created in step S1503 is m. The corresponding points of the corresponding point list 1 (corresponding points of "A")+the corresponding points of "B"+the corresponding points of asymmetric area are registered in the minimum distance corresponding point list 2.

In step S1504, the feature comparison unit 207 initializes a variable Count indicating the repetition counts of the calculation process of the degree of similarity to 0. In step S1505, the feature comparison unit 207 determines whether the repetition count Count is over a predetermined number of maximum repetition processes Rn. If Count is over Rn, the transformation process of the degree of similarity is executed in step S1520, and the present process ends. If Count is not over Rn, the process moves to step S1506. Details in relation to the calculation process of the overall degree of similarity in step S1520 will be described later.

In step S1506, the feature comparison unit 207 initializes a variable Vote, which indicates the vote count, to 0. In step S1507, the feature comparison unit 207 randomly extracts two sets of coordinates of corresponding points from the minimum distance corresponding point list 1. In the description of the present embodiment, the coordinates are referred to as $Q_1(x'_1, y'_1)$ and $S_1(x_1, y_1)$ as well as $Q_2(x'_2, y'_2)$ and $S_2(x_2, y_2)$. In step S1508, the feature comparison unit 207 sets a coordinate transformation coefficient for the coordinate transformation process applied to the feature points of one of the query image and the comparison destination image so that the coordinates of the extracted pairs of features points match. In the present embodiment, a coefficient for the affine transform applied to the feature points of the query image is set. More specifically, the feature comparison unit 207 assumes that $Q_1(x'_1, y'_1)$ and $S_1(x_1, y_1)$ as well as $Q_2(x'_2, y'_2)$ and $S_2(x_2, y_2)$ satisfy the transform shown in Formula (9) and obtains variables a to f in Formula (9).

Figure 15B:
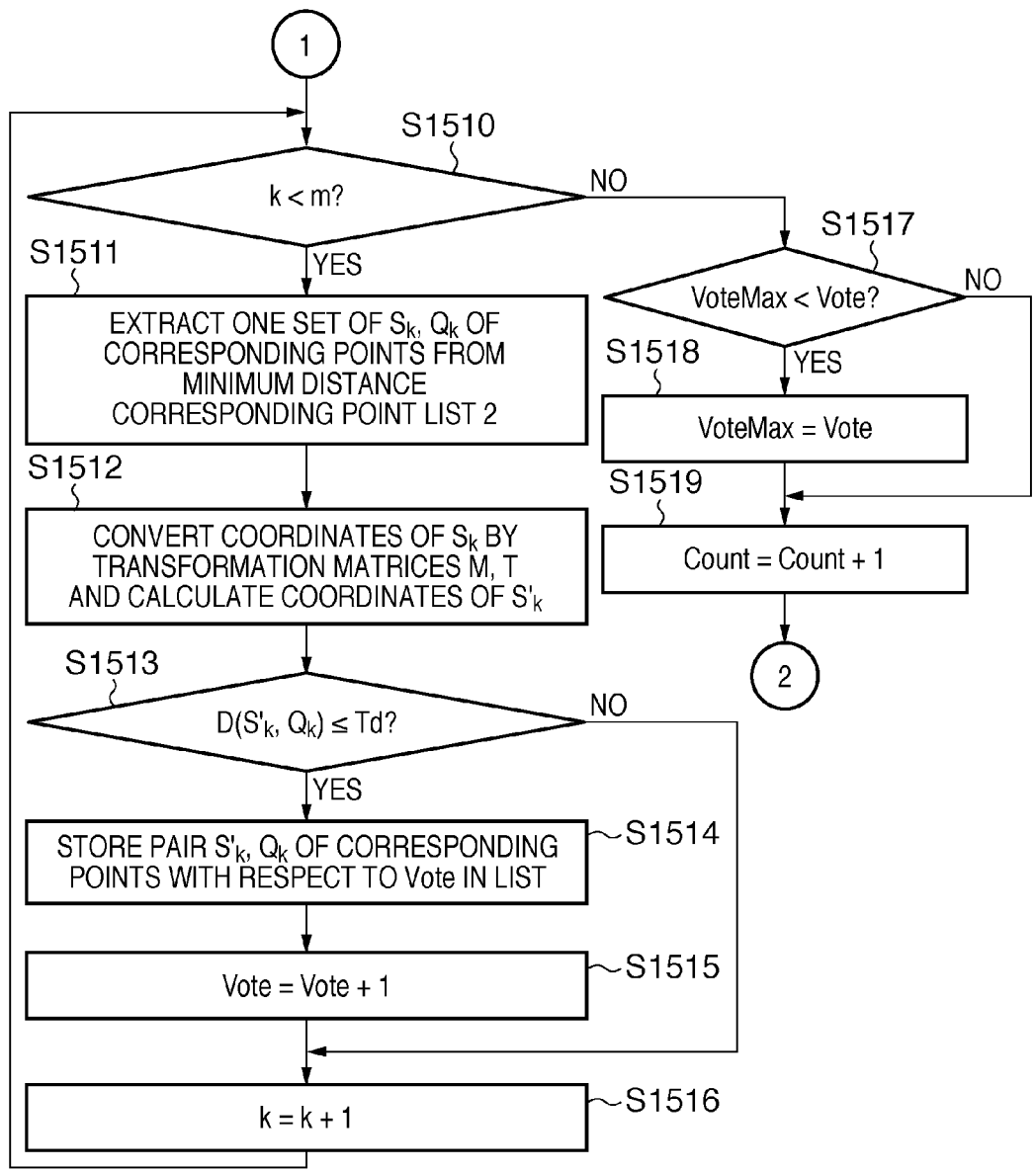

However, a matrix constituted by the variables a to d is referred to as M, and a matrix constituted by the variables e to f is referred to as T in step S1508 of the flow chart shown in FIGS. 15A and 15B.

$$\begin{pmatrix} x'_k \\ y'_k \end{pmatrix} = \begin{pmatrix} a & b \\ c & d \end{pmatrix}\begin{pmatrix} x_k \\ y_k \end{pmatrix} + \begin{pmatrix} e \\ f \end{pmatrix} \quad (9)$$

In the present embodiment, only the similarity transformation will be considered for simplification. In this case, Formula (9) is rewritten as Formula (10).

$$\begin{pmatrix} x'_k \\ y'_k \end{pmatrix} = \begin{pmatrix} a & -b \\ b & a \end{pmatrix}\begin{pmatrix} x_k \\ y_k \end{pmatrix} + \begin{pmatrix} e \\ f \end{pmatrix} \quad (10)$$

The variables a, b, e, and f are expressed by Formulas (11) to (14) using $x'_1, y'_1, x_1, y_1, x'_2, y'_2, x_2$, and $y_2$.

$$a = \frac{(x_1 - x_2)(x'_1 - x'_2) + (y_1 - y_2)(y'_1 - y'_2)}{(x_1 - x_2)^2 + (y_1 - y_2)^2} \quad (11)$$

$$b = \frac{(x_1 - x_2)(y'_1 - y'_2) - (y_1 - y_2)(x'_1 - x'_2)}{(x_1 - x_2)^2 + (y_1 - y_2)^2} \quad (12)$$

$$e = \frac{(y'_1 - y'_2)(x_1 y_2 - x_2 y_1) - (x'_1 + x'_2)(x_1 x_2 + y_1 y_2) +}{(x_1 - x_2)^2 + (y_1 - y_2)^2} \quad (13)$$

$$f = \frac{(x'_1 - x'_2)(y_1 x_2 - y_2 x_1) - (y'_1 + y'_2)(y_1 y_2 + x_1 x_2) +}{(x_1 - x_2)^2 + (y_1 - y_2)^2} \quad (14)$$

In step S1509, a corresponding point selection variable k is initialized to 0.

In step S1510, the feature comparison unit 207 determines whether the corresponding point selection variable k is over the number of sets m of the corresponding points registered in the minimum distance corresponding point list 2. If it is determined that k is over m, the process moves to step S1517, which will be described later. If the corresponding point selection variable k is not over the number of sets m of the corresponding points registered in the minimum distance corresponding point list 2 as a result of the determination in step S1510, the process moves to step S1511.

In step S1511, a set of points $S_k(x_k, y_k)$ and $Q_k(x'_k, y'_k)$ is randomly selected from the minimum distance corresponding point list 2.

In step S1512, the feature comparison unit 207 obtains coordinates $S'_k(x'_k, y'_k)$, which are converted from $S_k(x_k, y_k)$ using Formula (9).

In step S1513, the feature comparison unit 207 calculates a geometric distance between the coordinate $S'_k(x'_k, y'_k)$ and the coordinate $Q_k(x'_k, y'_k)$ in Euclidean distance and determines whether the Euclidean distance is equal to or smaller than a threshold Td. If the Euclidean distance is equal to or smaller than the threshold Td, the feature comparison unit 207 stores a pair of corresponding points $S'_k$ and $Q_k$ with respect to Vote in step S1514. In step S1515, the vote count Vote is incremented, and the process moves to step S1516. On the other hand, if the Euclidean distance is greater than the threshold Td, no operation is performed, and the process moves to step S1516. In step S1516, the corresponding point selection variable k is incremented, and the process returns to step S1510.

Step S1517 will now be described, which is a process executed when the corresponding point selection variable k is over the number of sets m of the corresponding points registered in the minimum distance corresponding point list in step S1510. The feature comparison unit 207 compares the value of the vote count Vote and the value of the final vote count VoteMax in step S1517. If the value of the vote count Vote is greater than the value of the final vote count VoteMax, the feature comparison unit 207 executes a process of step S1518. In step S1518, the feature comparison unit 207 replaces the value of the final vote count VoteMax by the value of the vote count Vote and then increments Count by one in step S1519. The process returns to step S1505. On the other hand, if the value of the vote count Vote is equal to or smaller than the value of the final vote count VoteMax in step S1517, no operation is performed. The feature comparison unit 207 increments Count by one in step S1519, and the process returns to step S1505.

Figure 17:
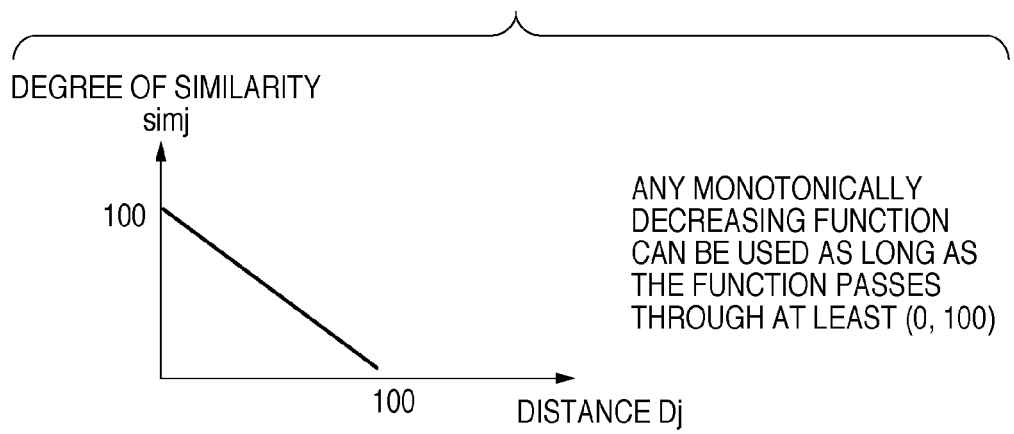
FIG. 17 shows an example of a look-up table for transforming a distance into a degree of similarity.

In step S1520, a transform of degree of similarity is applied to the final vote count based on a final vote count-degree of similarity transformation table of monotonically decreasing characteristics shown in FIG. 17 to obtain the final degree of similarity.

Although the similarity transformation is considered in the description of the calculation method of the degree of similarity according to the present embodiment, other geometric transforms, such as affine transform, can also be applied by obtaining transformation matrices corresponding to the transforms in step S1508. For example, in the case of the affine transform, the number of coordinates of the set of randomly selected corresponding points is set to 3 in step S1507. In step S1508, Formula (8) is used instead of Formula (9), and three sets of corresponding points (six points in total) selected in step S1507 can be used to obtain the variables a to f.

Figure 16B:
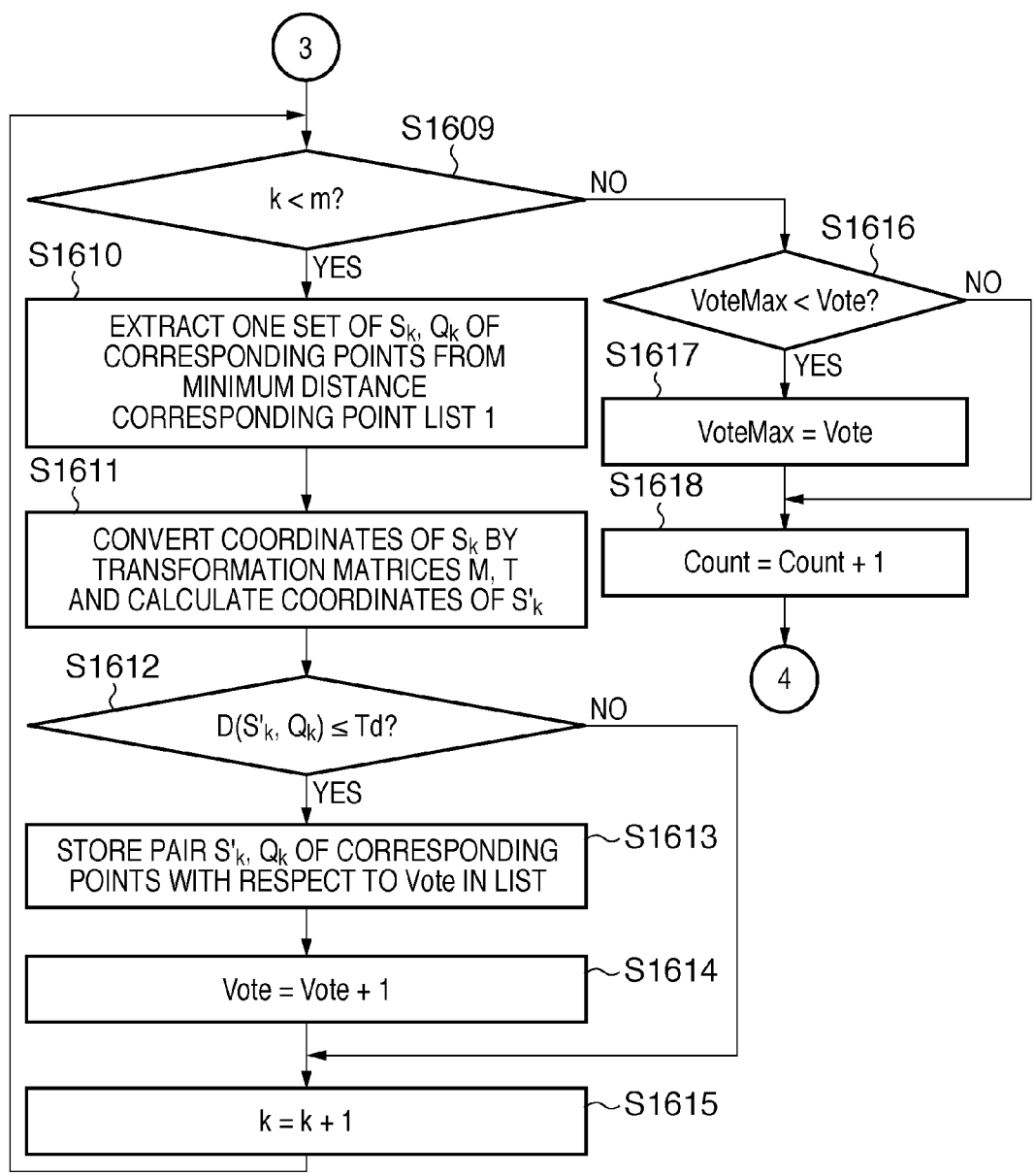

The process when it is determined in step S1401 of FIG. 14 that the query image is not symmetric (step S1403) will now be described with reference to FIGS. 16A and 16B. Differences from the process described with reference to FIGS. 15A and 15B will be described.

A difference from the process shown in FIGS. 15A and 15B is that the minimum distance corresponding point list 1 is created for the feature points in the entire image in step S1602 for a process corresponding to steps S1502 and S1503, because the query image is not symmetric.

Obviously, pairs of feature points to be geometrically transformed will be selected from the minimum distance corresponding point list 1 in S1606 and S1610.

It is also different that the initial value of k is set to 3 (k=3) in step S1608 to not to again select in S1610 two pairs of points as a basis of geometric transformation selected in step S1606.

The same processes as in FIGS. 15A and 15B (S1501, S1504 to S1506, S1508, S1510, and S1512 to S1520) are executed for other processes (steps S1601, S1603 to S1605, S1607, S1609, and S1610 to S1619).

As described, according to the first embodiment, a combination of similar feature points can be made appropriate in relation to the search of image including geometrically symmetric parts, and the image can be searched without unnecessarily increasing the number of possible corresponding points.

Although the Hough transform is used to obtain the symmetry axis in the embodiment described above, the arrangement is not limited to this. A second embodiment is an example of obtaining the symmetry area with another method without using the Hough transform, and other processes are the same as in the first embodiment.

Figure 18B:
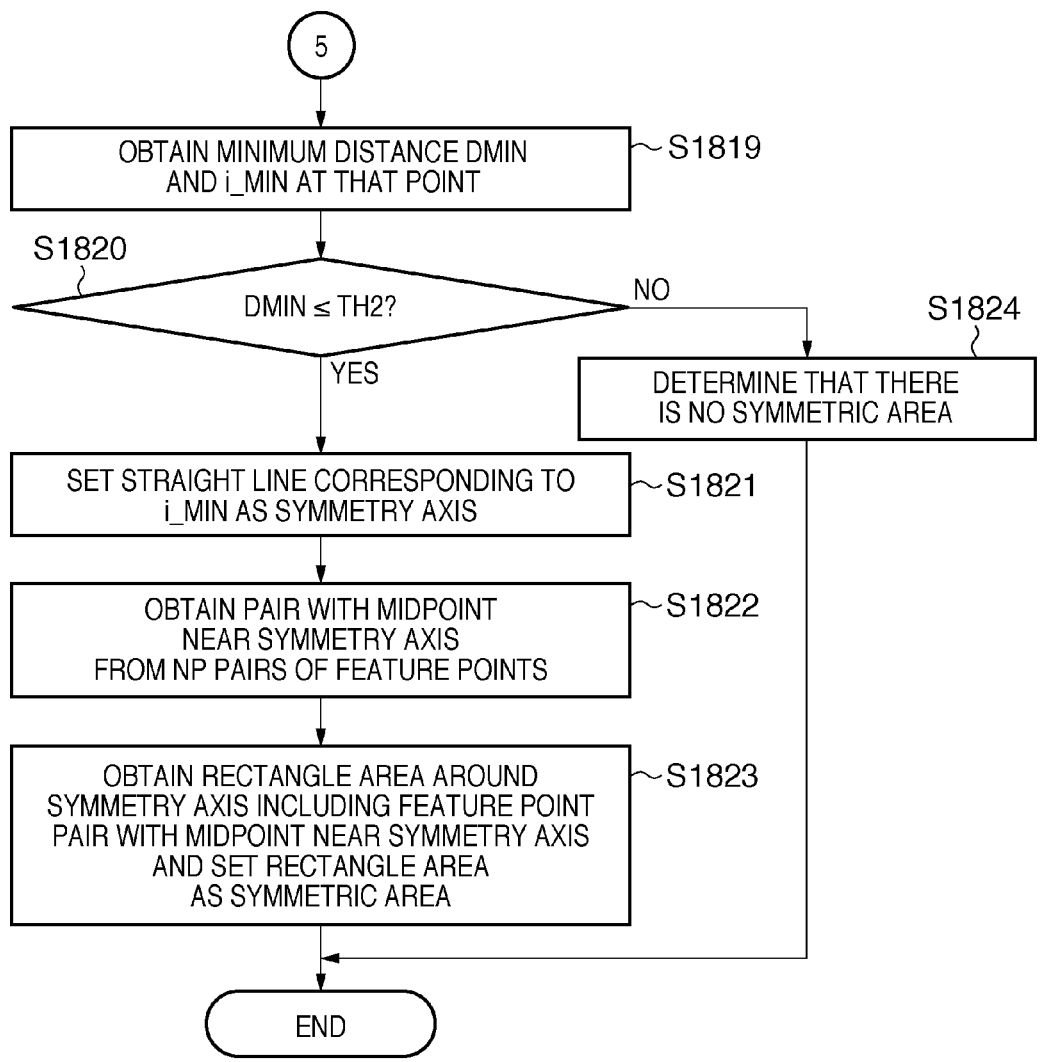

FIGS. 18A and 18B show flows of the process, and the process will be described.

In step S1801, the symmetric area extraction unit 108 (206) obtains the degrees of similarity for all combinations of the feature points in the image, obtains pairs of features points in which the degree of similarity is equal to or greater than the threshold TH 1, and the number of pairs will be referred to as NP. As a result of the threshold process, high-quality possible pairs of similar feature points are created.

In step S1802, midpoints of NP similar feature point pairs are obtained. In step S1803, a counter i is set to 1, and NC is set, where NC<(NP*(NP−1)/2). Processes of steps S1805 to S1807 and S1818 are executed while i≦NC is satisfied in step S1804. When i≦NC is not satisfied, the process diverges to step S1819. In this case, NP*(NP−1)/2 denotes the number of combinations of selection of two arbitrary points from NP points.

The symmetric area extraction unit 108 (206) randomly selects two points from the group of NP midpoints in step S1805 and obtains the straight line of the two points in step S1806.

In S1807, the symmetric area extraction unit 108 (206) obtains the group of NP midpoints and distances of straight lines and adds the distances to obtain an accumulated distance. In step S1818, i, the accumulated distance, the selected two points, and a formula of the straight line are stored, and the process returns to step S1804.

Although the sum of the distances is used in step S1807, it is obvious that the sum of square distances can be set as the accumulated distance.

In step S1819, the symmetric area extraction unit 108 (206) obtains i_MIN, which denotes the minimum sum of the obtained distances or the minimum square distance, and the distance DMIN. In step S1820, if DMIN is equal to or smaller than a threshold TH 2, it is determined that there is a symmetry axis/symmetric area, and the process proceeds to step S1821. On the other hand, if DMIN is greater than the threshold TH 2, the process proceeds from S1820 to step S1824. It is determined that there is no symmetric area, and the present process ends.

In step S1821, the symmetric area extraction unit 108 (206) sets the straight line corresponding to i_MIN as the symmetry axis. In step S1822, the symmetric area extraction unit 108 (206) obtains a pair, in which the midpoint is near the symmetry axis, from the NP pairs of feature points. In step S1823, the symmetric area extraction unit 108 (206) includes the feature point pair, in which the midpoint is near the symmetry axis, and obtains a rectangle area around the symmetry axis. The symmetric area extraction unit 108 (206) sets the rectangle area as a symmetric area, and the present process ends.

According to the processes, a dominant symmetric area in the image can be detected. In the process, in relation to a straight line with the minimum accumulated distance, the corresponding straight line is set as the symmetry axis if the accumulated distance is equal to or smaller than the threshold TH2. However, the arrangement is not limited to this, and for example, one or a plurality of straight lines, in which the accumulated distance is smaller than a threshold, may be extracted, and the straight lines may be handled as the symmetry axes.

Although a precise symmetry axis may not be obtained in the process, the present invention is intended to decide partial symmetric areas "A" and "B" of a symmetric area and handle the feature points in consideration of "A" and "B". Therefore, the precise symmetry axis does not have to be obtained. Obviously, another simple method may be used if the symmetric area as well as "A" and "B" can be set.

If it is determined that the query image is symmetric (symmetric area exists) after the verification of symmetry of the query image, the comparison with the registered image without symmetry (symmetric area does not exist) is worthless. Therefore, when the query image is a symmetric image, only the registered image, in which the number of symmetric areas NL obtained in the symmetry analysis of the registered image is not 0, is compared. This can significantly simplify the process, and a quick search is possible.

The query image may be rotated or enlarged/reduced to obtain the distribution of the feature amount at the feature points. A similar distance normalized by a fluctuation range as a result of the rotation or the enlargement/reduction may be obtained upon the comparison of certain feature points, and then the overall degree of similarity based on a plurality of feature points may be obtained. In this way, the distances at the feature points may be made equal, and the accuracy of the similar distance improves. A reduction in the dispersion due to the rotation or the enlargement/reduction can be expected.

As described, according to the embodiments, the speed of the search processing can be improved, and the search can be made highly accurate in the search of a geometrically symmetric image (or image including such symmetric areas).

According to the embodiments, a combination of similar feature points can be made appropriate in relation to the search of an image including geometrically symmetric parts, and the search is possible without unnecessarily increasing the number of possible corresponding points.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-125845, filed May 25, 2009, which is hereby incorporated by reference herein in its entirety.

What is claimed is:

1. An image search apparatus that searches an image similar to an inputted query image from registered images, the image search apparatus comprising:

an extraction unit configured to acquire a pair of feature points corresponding to each other based on a feature amount of feature points in the query image and to extract a symmetric partial image based on the acquired pair of feature points, wherein among a straight line group passing through two points selected from a midpoint group obtained from the plurality of sets of pairs of feature points acquired from the query image, said extraction unit is configured to set a straight line, in which an accumulated distance from the midpoint group is minimum, as a symmetry axis and to extract an area including the pair of feature points with the midpoint near the symmetry axis as the symmetric partial image;

a decision unit configured to decide two partial areas, which are obtained by dividing the partial image at a symmetry axis of the partial image, as a first area and a second area based on the tendency of image features in the partial image;

a setting unit configured to extract, based on the feature amount, at least two sets of corresponding pairs of feature points from the feature points in partial areas decided as the first area of the query image and a registered comparison destination image and to set a coordinate transformation coefficient for transforming the feature points of one of the two images so that the coordinates of the extracted pairs of feature points match; and a comparison unit configured, in order to determine the similarity between the two images, to extract pairs of feature points corresponding to each other from the feature points in the two images based on the feature amount to transform coordinates of the feature points extracted from the one of the images by a coordinate transformation process using the coordinate transformation coefficient, and to compare the coordinates of the feature points after the transformation with coordinates of the feature points in the other image of the two images, wherein at least one processor functions as at least one of the units.

2. The apparatus according to claim 1, wherein said comparison unit is configured to extract pairs of corresponding feature points from each of the area decided as the first area, the area decided as the second area, and an asymmetric area excluding the symmetric partial area extracted by said extraction unit, of the two images.

3. The apparatus according to claim 1, wherein the feature points are rotation-invariant feature points, and the feature amount is a rotation-invariant local feature amount.

4. The apparatus according to claim 1, wherein if a symmetric partial image is not extracted from the query image in said extraction unit, said setting unit is configured to extract at least two sets of pairs of corresponding feature points from the entire two images.

5. The apparatus according to claim 1, wherein said decision unit is configured to decide the two partial areas as the first area and the second area based on directions of concentration gradient in the two partial areas.

6. The apparatus according to claim 1, wherein said decision unit is configured to decide the two partial areas as the first area and the second area depending on whether the numbers of the feature points in the two partial areas are large or small.

7. The apparatus according to claim 1, wherein the determination of the similarity with the query image is not applied to the comparison destination image without a partial area decided as the first area.

8. An image search method of searching for an image similar to an inputted query image from registered images, the image search method comprising:

an extraction step of acquiring a pair of feature points corresponding to each other based on a feature amount of feature points from the query image and extracting a symmetric partial image based on the acquired pair of feature points, wherein among a straight line group passing through two points selected from a midpoint group obtained from the plurality of sets of pairs of feature points acquired from the query image, said extraction step sets a straight line, in which an accumulated distance from the midpoint group is minimum, as a symmetry axis and extracts an area including the pair of feature points with the midpoint near the symmetry axis as the symmetric partial image;

a decision step of deciding two partial areas which are obtained by dividing the partial image at a symmetry axis of the partial image, as a first area and a second area based on the tendency of image features in the partial image;

a setting step of extracting, based on the feature amount, at least two sets of corresponding pairs of feature points from the feature points in partial areas decided as the first area of the query image and a registered comparison destination image and setting a coordinate transformation coefficient for transforming the feature points of one of the two images so that the coordinates of the extracted pairs of feature points match; and a comparison step of, in order to determine the similarity between the two images extracting pairs of feature points corresponding to each other from the feature points in the two images based on the feature amount transforming coordinates of the feature points extracted from the one of the images by a coordinate transformation process using the coordinate transformation coefficient, and comparing the coordinates of the feature points after the transformation with coordinates of the feature points in the other image of the two images.

9. A non-transitory computer-readable storage medium storing a computer program causing a computer to execute the image search method according to claim 8.

10. An image search apparatus that searches an image similar to an inputted query image from registered images, the image search apparatus comprising:

an extraction unit configured to acquire a pair of feature points corresponding to each other based on a feature amount of feature points in the query image and to extract a symmetric partial image based on the acquired pair of feature points, wherein said extraction unit is configured to obtain the symmetry axis by applying a Hough transform to a midpoint group obtained from a plurality of sets of pairs of feature points acquired from the query image and to extract an area which includes a pair of feature points with the midpoint near the symmetry axis, as the symmetric partial image;

a decision unit configured to decide two partial areas, which are obtained by dividing the partial image at a symmetry axis of the partial image, as a first area and a second area based on the tendency of image features in the partial image;

a setting unit configured to extract, based on the feature amount, at least two sets of corresponding pairs of feature points from the feature points in partial areas decided as the first area of the query image and a registered comparison destination image and to set a coordinate transformation coefficient for transforming the feature points of one of the two images so that the coordinates of the extracted pairs of feature points match; and a comparison unit configured, in order to determine the similarity between the two images, to extract pairs of feature points corresponding to each other from the feature points in the two images based on the feature amount to transform coordinates of the feature points extracted from the one of the images by a coordinate transformation process using the coordinate transformation coefficient, and to compare the coordinates of the feature points after the transformation with coordinates of the feature points in the other image of the two images, wherein at least one processor functions as at least one of the units.

11. An image search method of searching for an image similar to an inputted query image from registered images, the image search method comprising:

an extraction unit configured to acquire a pair of feature points corresponding to each other based on a feature amount of feature points in the query image and to extract a symmetric partial image based on the acquired pair of feature points, wherein said extraction unit is configured to obtain the symmetry axis by applying a Hough transform to a midpoint group obtained from a plurality of sets of pairs of feature points acquired from the query image and to extract an area which includes a pair of feature points with the midpoint near the symmetry axis, as the symmetric partial image;

a decision unit configured to decide two partial areas, which are obtained by dividing the partial image at a symmetry axis of the partial image, as a first area and a second area based on the tendency of image features in the partial image;

a setting unit configured to extract, based on the feature amount, at least two sets of corresponding pairs of feature points from the feature points in partial areas decided as the first area of the query image and a registered comparison destination image and to set a coordinate transformation coefficient for transforming the feature points of one of the two images so that the coordinates of the extracted pairs of feature points match; and a comparison unit configured, in order to determine the similarity between the two images, to extract pairs of feature points corresponding to each other from the feature points in the two images based on the feature amount to transform coordinates of the feature points extracted from the one of the images by a coordinate transformation process using the coordinate transformation coefficient, and to compare the coordinates of the feature points after the transformation with coordinates of the feature points in the other image of the two images, wherein at least one processor functions as at least one of the units.

* * * * *